United States Patent [19]
Trower, II et al.

[11] Patent Number: 6,121,981
[45] Date of Patent: Sep. 19, 2000

[54] METHOD AND SYSTEM FOR GENERATING ARBITRARY-SHAPED ANIMATION IN THE USER INTERFACE OF A COMPUTER

[75] Inventors: Tandy W. Trower, II, Woodinville; Mark Jeffrey Weinberg, Carnation; John Wickens Lamb Merrill, Redmond, all of Wash.

[73] Assignee: Microsoft Corporation, Redmond, Wash.

[21] Appl. No.: 08/858,555

[22] Filed: May 19, 1997

[51] Int. Cl.[7] .................................................. G06T 13/00
[52] U.S. Cl. ........................... 345/473; 345/348; 345/523; 345/977
[58] Field of Search .................... 345/473, 474, 345/523, 977, 348

[56] References Cited

U.S. PATENT DOCUMENTS

| | | |
|---|---|---|
| 4,884,972 | 12/1989 | Gasper . |
| 5,111,409 | 5/1992 | Gasper et al. . |
| 5,278,943 | 1/1994 | Gasper et al. . |
| 5,287,446 | 2/1994 | Williams et al. . |
| 5,377,997 | 1/1995 | Wilden et al. . |
| 5,425,139 | 6/1995 | Williams et al. . |
| 5,430,835 | 7/1995 | Williams et al. . |
| 5,613,056 | 3/1997 | Gasper et al. . |
| 5,630,017 | 5/1997 | Gasper et al. . |
| 5,838,334 | 11/1998 | Dye .......................................... 345/503 |

OTHER PUBLICATIONS

Ken Getz, "Office 97 Shared Programmable Objects," 1997, MSDN Library, Apr. 1998 Version.
Toggle Entertainment, Inc., "HTTP://togglethis.com," 1997, 1998, World Wide Web.
Microsoft Corp., "Microsoft visual Basic for Applications, Version 5.0 Solutions Enhancements Guide," Oct. 1996, MSDN Library, Apr. 1998 Version.

*Primary Examiner*—Mark K. Zimmerman
*Assistant Examiner*—Chanté Harrison
*Attorney, Agent, or Firm*—Klarquist Sparkman Campbell Leigh & Whinston LLP

[57] ABSTRACT

An animation method and system generates interactive animation in the foreground of the user interface of the computer. The system generates arbitrary shaped animation that is independent of the background image of the user interface by computing a bounding region for a current animation frame in real time and creating a non-rectangular window to match this bounding region. The system draws the animation to this non-rectangular window, which clips the frame to the bounding region of the graphical object. The system can be used to create interactive animation that is not confined to a rectangular window of a hosting application or a window of the application making the request to playback animation.

19 Claims, 7 Drawing Sheets

METHOD AND SYSTEM FOR GENERATING ARBITRARY-SHAPED ANIMATION IN THE USER INTERFACE OF A COMPUTER

TECHNICAL FIELD

The invention relates to computer generated animation and more specifically relates to generating arbitrary shaped animation.

BACKGROUND

A typical computer animation system creates the effect of movement or "animation" of objects on a display screen by displaying rectangular-shaped computer graphics (bitmaps) one after another at various time intervals. In many computers, application programs use graphic support software to draw bitmaps to a frame buffer. To give the appearance of movement, the application will draw a new picture into the frame buffer at sufficient intervals to give the appearance of smooth motion of a graphical object. A hardware device called a video controller manages the display of the picture in the frame buffer by periodically refreshing the display screen with the contents of the frame buffer.

Popular operating systems today support windowing environments. This allows application programs running in the computer to display their visual output and receive input through a rectangular portion of the screen called a window. In windowing systems, the operating system typically displays its own interface called the "shell" in one or more windows. In addition to displaying its interface, the operating system includes graphic support software to allow applications to create and display their own windows.

When an application program wishes to create animation in a conventional windowing environment, it draws a sequence of rectangular pictures into a rectangular-shaped window. Each picture or "frame" in the animation typically consists of one or more non-rectangular objects. The graphical objects in a given frame are typically stored in a bitmap. A bitmap is a digital image comprised of a rectangular array of numbers corresponding to individual picture elements (pixels) on the display screen. These data values are commonly referred to as the pixels.

Each of the graphical objects in any given frame of animation are usually stored in separate bitmaps. A graphical object is represented by non-transparent pixels in the bitmap, and the remainder of the bitmap is filled with transparent pixels to make it rectangular. To create this type of file, the non-rectangular shaped object is composited with a rectangular bitmap that is filled with a constant color (the transparent color).

When animating bitmaps within a window of a single hosting application, the host is aware of and can control a background bitmap. In order to display a single frame of the animation, the system composites in memory the known background of the application with the non-transparent pixels of the animation frame. It then displays the composite image on the display device. Repeating this over various time intervals produces computer animation. A key requirement of this technique is that the animation system must always have the background bitmap of the hosting application.

This raises the question of how to animate computer graphics when the background bitmap is not known. Computer game machines such as Nintendo® and Sega® use a technique known as multi-plane video. This allows software to act independently on different planes of video while the compositing of the different planes is done very quickly by computer microchips. Standard PC computer systems do not have multi-plane video hardware, and therefore applications cannot take advantage of multi-plane hardware to display animation on an independent video plane.

Without special hardware support, it is difficult to create arbitrary-shaped, interactive animations that play outside of the rectangular window of a host application. As noted above, an application can play back a non-rectangular animation within its own window, but the animation is confined to rectangular window of the application. Another disadvantage is that the host window of the animation, even if it is transparent outside the boundary of the animation, prevents user input from passing through to the windows of other applications on the desktop. Even though portions of the host window of animation may be transparent, the window is still rectangular and responsive to mouse input at locations within the rectangular window.

In the past, PC computer operating systems supported only rectangular windows. The Windows® 95 Operating System from Microsoft supports "region windows," which can be non-rectangular in shape. This means that all input from the user to the window and any repainting that the window does is "clipped" to the window's region.

SUMMARY OF THE INVENTION

The invention provides a method and system for generating arbitrary shaped animation in the user interface of a computer. The invention can be used to generate arbitrary shaped animation that is not confined to a rectangular window of a hosting application program, but instead, moves independently across the entire user interface. In effect, the user interface of the operating system (the shell or "desktop") and all windows displayed in the user interface become the background to the animation, which plays in an non-rectangular window with a shape that matches the current frame of animation. This animation technology is particularly suited for creating interactive, animated user interface characters, but it can be applied to a variety of other forms of animation as well.

The method includes a number of steps for generating arbitrary shaped animation in the user interface of a computer. To play a sequence of animation, an animation system in the computer loads a sequence of animation into memory. The system constructs the current frame from one or more bitmaps and then computes a bounding region for the current frame in real time. The bounding region describes the non-transparent portion of the current frame. The animation system creates a non-rectangular window using the bounding region for the current frame to define the window's shape. When the animation system draws the current frame on the computer's display screen, the animation is clipped to the non-rectangular window, which has a shape matching the non-transparent portion of the current frame. This process repeats to draw subsequent frames and give the effect of animation in the foreground of the computer's user interface.

One important use of this invention is to create interactive animation that is played on top of, and independent of other applications' windows in the user interface. The interactive animation is responsive to user input from a cursor control device, such as a mouse, when the cursor (e.g., pointer associated with a mouse) is positioned over the non-transparent portion of the animation. The transparent portion of the current animation is not responsive to input from the cursor device and therefore does not interfere with applications' windows that lie behind the animation. This enhances the effect that the animation is outside the context of any hosting application running in the computer.

In one implementation of the invention, the animation system includes three primary components: a loader, a sequencer, and a regionizer. The loader loads an animation file and reads an animation header that describes the contents of the animation. The sequencer determines which frame to play back, constructs the frame, and controls the timing of the next frame. The regionizer computes the bounding region of the current animation frame in real time and uses this to create a non-rectangular window with a shape matching the bounding region of the current frame. The sequencer draws visible content of the current frame to this non-rectangular window, which clips the current frame to the bounding region.

In this implementation, a region window controller in the operating system uses the bounding region data passed to it by the regionizer to set the shape of the non-rectangular window for the current frame. The region window controller is also responsible for clipping user input within the bounding region of the window. As a result, the animation is responsive to cursor input only on its visible portion on the display screen. The region window controller enables the user to move the animation around the display screen by "dragging" and "dropping" the animation using a cursor control device such as a mouse.

The invention provides a number of advantages. Using the method outlined above, an animation system can generate arbitrary shaped animation on top of the standard PC desktop and other applications' windows in the computer's user interface. The animation is not confined to the window of the hosting application, but instead, moves freely about the desktop user interface. The visible portions of an animation are not composited over the background of a single hosting application. Rather, the animation is drawn to a non-rectangular window, whose shape is re-computed for each frame in real time. This approach makes the animation independent of the windows currently being displayed on the user interface, and gives the effect of multi-plane video hardware without using special hardware to overlay the animation on the display image in the computer's frame buffer.

Further features and advantages of the invention will become apparent from the following detailed description and accompanying drawings.

DETAILED DESCRIPTION

Computer Overview

Figure 1:
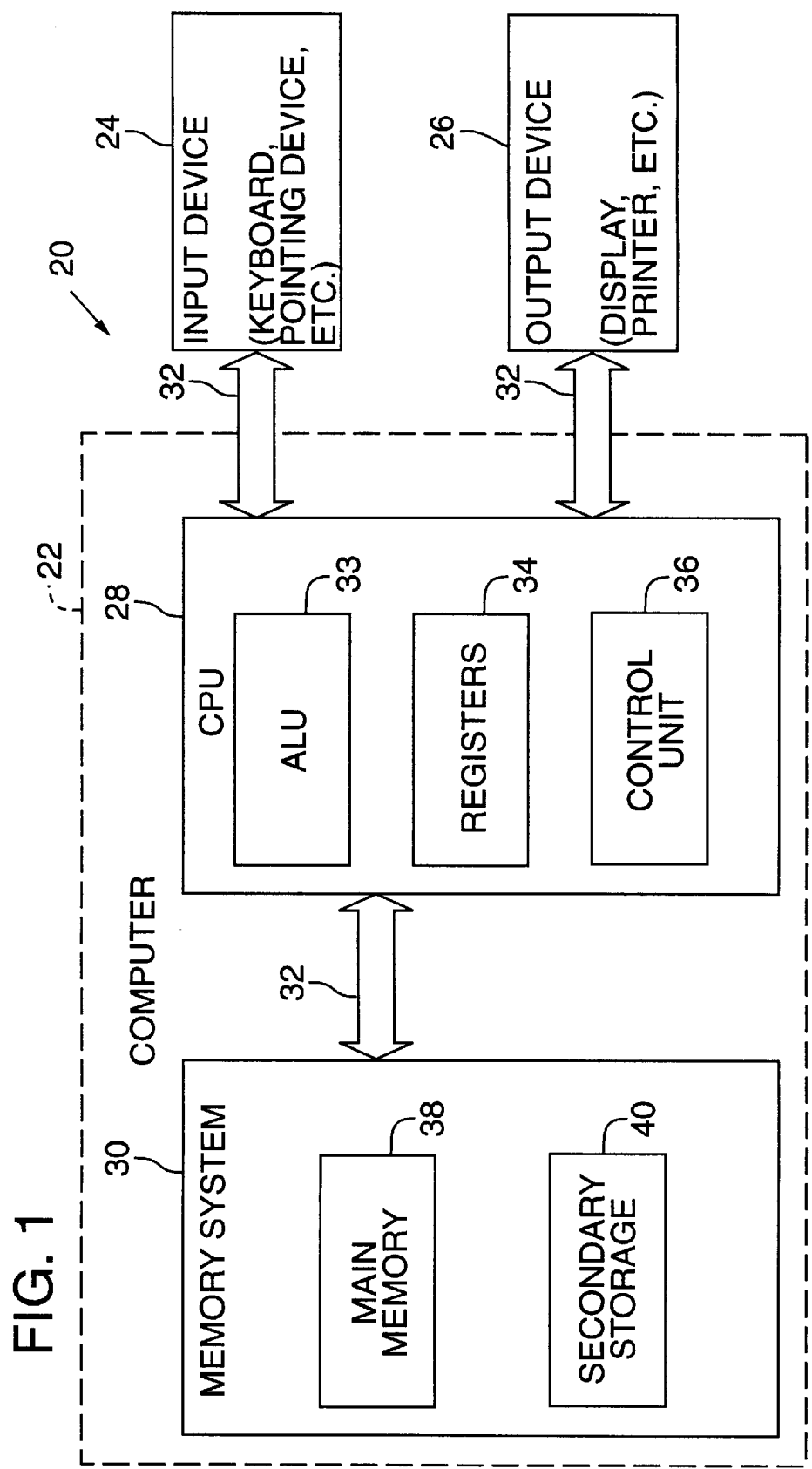
FIG. 1 is a general block diagram of a computer that serves as an operating environment for the invention.

FIG. 1 is a general block diagram of a computer system that serves as an operating environment for the invention. The computer system 20 includes as its basic elements a computer 22, one or more input devices 24, including a cursor control device, and one or more output devices 26, including a display monitor. The computer 22 has at least one high speed processing unit (CPU) 28 and a memory system 30. The input and output device, memory system and CPU are interconnected and communicate through at least one bus structure 32.

The CPU 28 has a conventional design and includes an ALU 33 for performing computations, a collection of registers 36 for temporary storage of data and instructions, and a control unit 36 for controlling operation of the system 20. The CPU 28 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 30 generally includes high-speed main memory 38 in the form of a medium such as random access memory (RAM) and read only memory (ROM) semiconductor devices, and secondary storage 40 in the form of long term storage mediums such as floppy disks, hard disks, tape, CD-ROM, flash memory, etc. and other devices that store data using electrical, magnetic, optical or other recording media. The main memory 38 also can include video display memory for displaying images through a display device. The memory 30 can comprise a variety of alternative components having a variety of storage capacities.

The input and output devices 24, 26 are conventional peripheral devices coupled to or installed within the computer. The input device 24 can comprise a keyboard, a cursor control device such as a mouse or trackball, a physical transducer (e.g., a microphone), etc. The output device 26 shown in FIG. 1 generally represents a variety of conventional output devices typically provided with a computer system such as a display monitor, a printer, a transducer (e.g., a speaker), etc. Since the invention relates to computer generated animation, a computer must have some form of display monitor for displaying this animation.

For some devices, the input and output devices actually reside within a single peripheral. Such devices, such as a network interface or a modem, operate as input and output devices.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the computer industry.

Animation System Overview

Figure 2:
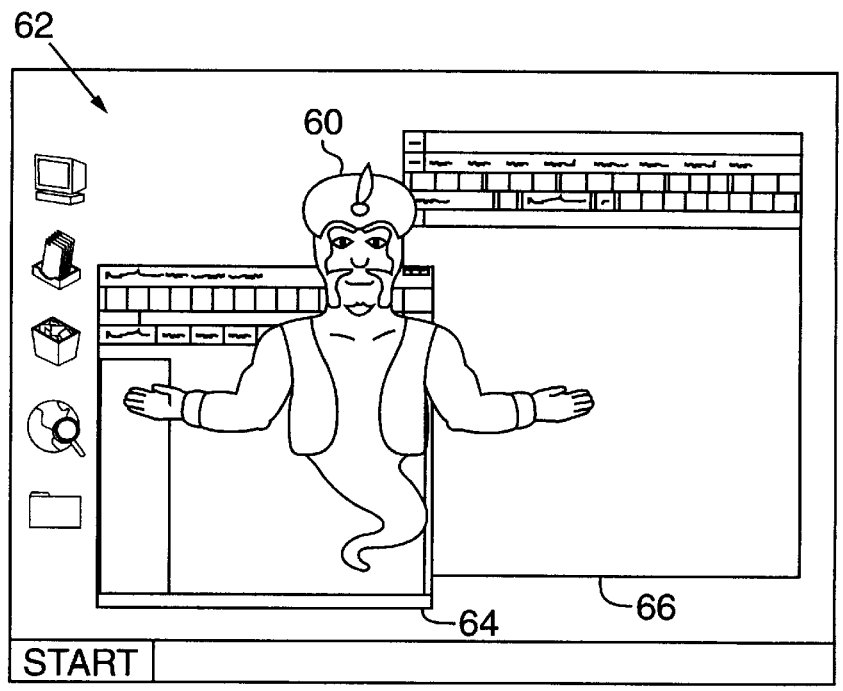
FIG. 2 is a screen shot illustrating an example of animated character located on top of the user interface in a windowing environment.

FIG. 2 is a screen shot illustrating an example of animated character located on top of (in the foreground of) the user interface in a windowing environment. This screen shot illustrates one example of how an implementation of the invention creates arbitrary shaped animation that is not confined to the window of a hosting application or the window of an application requesting playback of the animation. The animated character 60 can move anywhere in the user interface. In this windowing environment, the user interface, referred to as the "desktop," includes the shell 62 of the operating system as well as a couple of windows 64, 66 associated with currently running application programs. Specifically, this example includes an Internet browser application running in one window 64 and a word processor application 66 running in a second window on the desktop of the Windows® 95 Operating System. A client program, such as a script running within the process space of the browser, can request playback of an animation that plays outside the boundaries of the browser window 64. Similarly, a client program such as a word processing program can request playback of an animation that plays outside the boundaries of its window (e.g., window 66 in FIG. 2).

The animated character moves in the foreground of the "desktop" and each of the windows of the executing applications. As the character moves about the screen, the animation system computes the bounding region of the non-transparent portion of the animation and generates a new window with a shape to match this bounding region. This gives the appearance that the character is independent from the user interface and each of the other windows.

To generate an animation like this, the animation system performs the following steps:

1) loads the bitmap(s) for the current frame of animation;
2) constructs a frame of animation from these bitmaps (optional depending on whether the frame is already constructed at authoring time).
3) computes the bounding region of the constructed frame in real time;
4) sets a window region to the bounding region of the frame; and
5) draws the frame into the region window.

The bounding region defines the non-transparent portions of a frame of animation. A frame in an animation is represented as a rectangular area that encloses an arbitrary shaped animation. The pixels located within this rectangular area but do not form part of the arbitrary-shaped animation are transparent in the sense that they will not occlude or alter the color of the corresponding pixels in the background bitmap (such as the desktop in the Windows® Operating System) when combined with it. The pixels located in the arbitrary animation are non-transparent and are drawn to the display screen so that the animation is visible in the foreground.

The bounding region defines the area occupied by non-transparent pixels within the frame, whether they are a contiguous group of pixels or disjoint groups of contiguous pixels. For example, if the animation were in the shape of a red doughnut with a transparent center, the bounding region would define the red pixels of the doughnut as groups of contiguous pixels that comprise the doughnut, excluding the transparent center. If the animation comprised a football and goalposts, the bounding region would define the football as one or more groups of contiguous pixels and the goalposts as one or more groups of contiguous pixels. The bounding region is capable of defining non-rectangular shaped animation including one or more transparent holes and including more than one disjoint group of pixels.

Once computed, the bounding region can be used to set a region window, a non-rectangular window capable of clipping input and output to the non-transparent pixels defined by the bounding region. Region windows can be implemented as a module of the operating system or as a module outside of the operating system. Preferably, the software module implementing region windows should have access to input events from the keyboard and cursor positioning device and to the other programs using the display screen so that it can clip input and output to the bounding region for each frame. The Windows® Operating System supports the clipping of input and output to region windows as explained further below.

The method outlined above for drawing non-rectangular animation can be implemented in a variety of different types of computer systems. Below we describe an implementation of the invention in a client-server animation system. However the basic principles of the invention can be applied to different software architectures as well.

Figure 3:
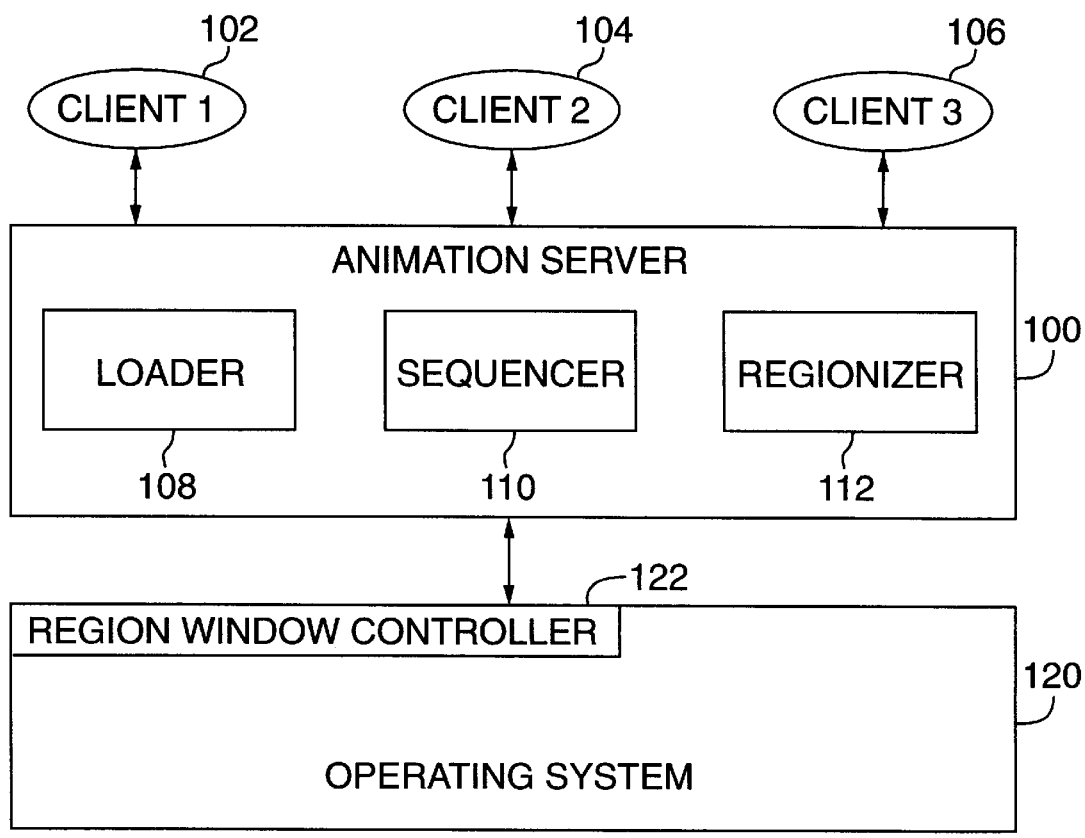
FIG. 3 is a diagram illustrating the architecture of an animation system in one implementation of the invention.

FIG. 3 is a general block diagram illustrating the architecture of a client server animation system. The animation system includes an animation server 100, which controls the playback of animation, and one or more clients 102–106, which request animation services from the server. During playback of the animation, the server relies on graphic support software in the underlying operating system 120 to create, post messages for, and paint windows.

In this specific implementation, the operating system also creates and clips input to non-rectangular windows. To show this in FIG. 3, part of the operating system is labeled, "region window controller" 122. This is the part of the operating system that manages region windows. The region window controller 122 creates a region window having a boundary matching the boundary of the current frame of animation. To accomplish this, the regionizer specifies the bounding region of the current frame to the operating system. The operating system monitors input and notifies the server of input events relating to the animation.

The services related to the playback of animation are implemented in three modules 1) the loader 108; 2) the sequencer 110 and 3) the regionizer 112. The sequencer module 108 is responsible for determining which bitmap to display at any given time along with its position relative to some fixed point on the display.

The loader module 110 is responsible for reading the frame's bitmap from some input source (either a computer disk file or a computer network) into memory. In cases where the bitmap is compressed, the loader module is also responsible for decompressing the bitmap into its native format. There are variety of known still image compression formats, and the decompression method, therefore, depends on the format of the compressed bitmap.

The regionizer module 112 is responsible for generating the bounding region of the frame, setting it as the clipping region of the frame's hosting region window and then drawing the frame into the region. In slower computers, it is not feasible to generate the bounding region as frames are constructed and played back. Therefore, in this implementation the regionizer also supports the loading of shape information in cases where it is precomputed and stored along with the frame data in the animation file.

The operating system in this implementation is the Windows® 95 operating system from Microsoft Corporation. The application programming interface for the operating system includes two functions used to create and control region windows.

These functions are:

1) SetWindowRgn; and
2) GetWindowRgn

SetWindowRgn

The SetWindowRgn function sets the window region of a rectangular host window. In this particular implementation, the window region is an arbitrary shaped region on the display screen defined by an array of rectangles. These rectangles describe the rectangular regions of pixels in the host window that the window region covers.

The window region determines the area within the host window where the operating system permits drawing. The operating system does not display any portion of a window that lies outside of the window region.

```
int SetWindowRgn(
      HWND hWnd,        // handle to window whose window region is to be set
      HRGN hRgn,        // handle to region
      BOOL bRedraw      // window redraw flag
    );
```

Parameters
hWnd
Handle to the window whose window region is to be set.
hRgn
Handle to a region. The function sets the window region of the window to this region. If hRgn is NULL, the function sets the window region to NULL.
bRedraw
Boolean value that specifies whether the operating system redraws the window after setting the window region. If bRedraw is TRUE, the operating system does so; otherwise, it does not. Typically, the program using region windows will set bRedraw to TRUE if the window is visible.
Return Values
If the function succeeds, the return value is nonzero.
If the function fails, the return value is zero.
Remarks
If the bRedraw parameter is TRUE, the system sends the WM_WINDOWPOSCHANGING and WM_WINDOWPOSCHANGED messages to the window.

The coordinates of a window's window region are relative to the upper-left corner of the window, not the client area of the window. After a successful call to SetWindowRgn, the operating system owns the region specified by the region handle hRgn. The operating system does not make a copy of the region. Thus, the program using region windows should not make any further function calls with this region handle. In particular, it should not close this region handle.
GetWindowRgn
The GetWindowRgn function obtains a copy of the window region of a window. The window region of a window is set by calling the SetWindowRgn function.

```
int GetWindowRgn(
      HWND hWnd,    // handle to window whose window region is to be obtained
      HRGN hRgn     // handle to region that receives a copy of the window region
    );
```

Parameters
hWnd
Handle to the window whose window region is to be obtained.
hrgn
Handle to a region. This region receives a copy of the window region.
Return Values
The return value specifies the type of the region that the function obtains. It can be one of the following values:

| Value | Meaning |
|---|---|
| NULLREGION | The region is empty. |
| SIMPLEREGION | The region is a single rectangle. |
| COMPLEXREGION | The region is more than one rectangle. |
| ERROR | An error occurred; the region is unaffected. |

Comments
The coordinates of a window's window region are relative to the upper-left corner of the window, not the client area of the window.

The region window controller shown in FIG. 3 corresponds to the software in the operating system that supports these functions.

Figure 4:
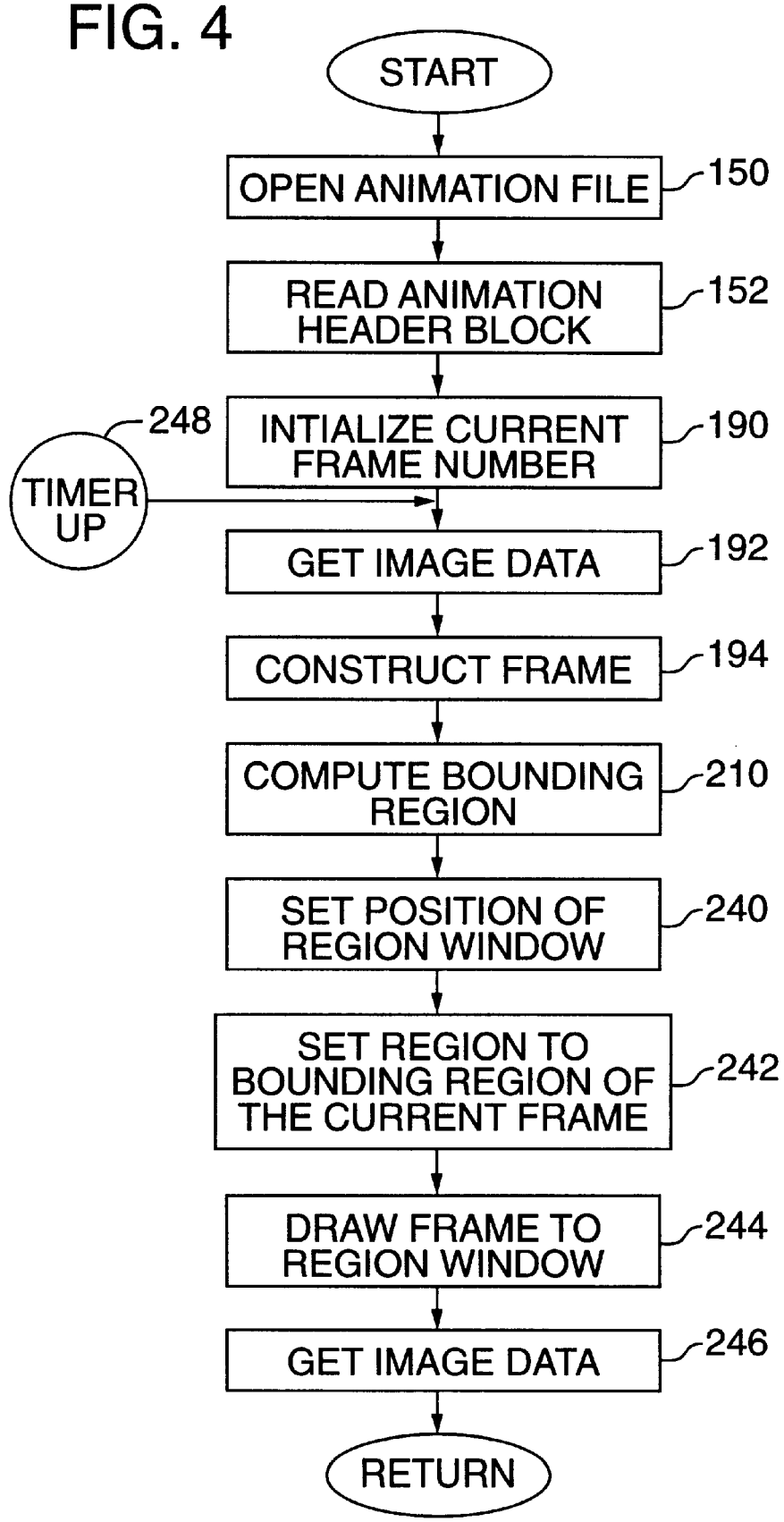
FIG. 4 is flow diagram illustrating how the animation server in FIG. 3 plays an animation.

In the next two sections, we describe two alternative implementations of the animation system shown in FIG. 3. Both implementations generate arbitrary shaped animation and can compute the arbitrary shaped region occupied by non-transparent pixels of a frame in real time. However, the manner in which each system computes and stores this region data varies. Specifically, since it is not computationally efficient to re-compute the region data for every frame, these systems use varying methods for caching region data. The advantages of each approach are summarized following the description of the second implementation.
First Implementation of the Animation System
FIG. 4 is flow diagram illustrating how the animation server plays an animation. First, the animation data file is opened via the computer's operating system as shown in step 150. The animation data file includes an animation header block and a series of bitmaps that make up each of the frames in the animation. Once the operating system has opened the file, the loader module 108 reads the animation header block to get all of data needed to play an animation and passes it to the sequencer as shown in step 152.

Figure 5:
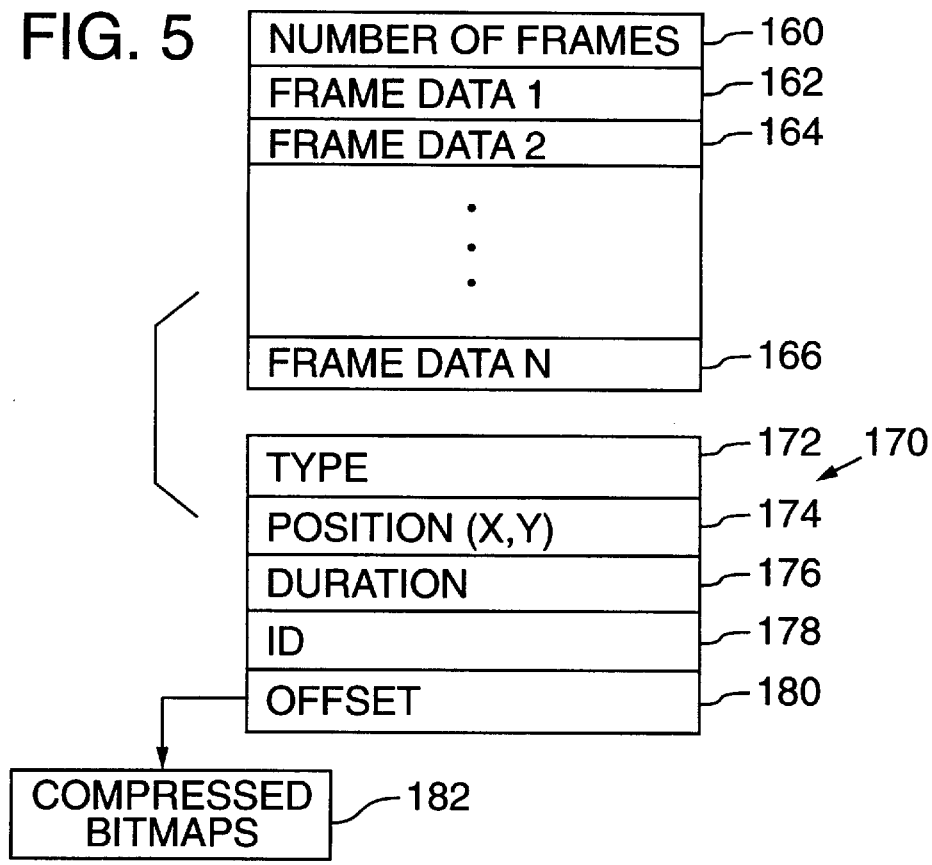
FIG. 5 illustrates an example of the animation file structure.

FIG. 5 illustrates an example of the animation file structure. The animation header lists the number of frames (160) and includes a block of data for each frame (see items 162–166 in FIG. 5 for example). The frame data 170 consists of a type (image, branch or sound) 172, frame position (x, y coordinates) 174, duration (in 1000ths of a second) 176, a unique ID 178, and an offset 180 into the animation data file where the compressed bitmaps 182 for the frame reside. Animation branch frames allow developers to specify alternate pathways through the animation sequence other than the default sequential flow. Sound frames allow developers to specify digitized sound data to be played at a specific time in the animation sequence.

Back at FIG. 4, the process for playing animation continues at step 190, where the sequencer initializes the current frame number. Once the loader has successfully loaded the animation header block, the sequencer can start playing the animation. It initializes the current frame number to zero and looks at the type field of the current block of frame data to determine the type for the current frame.

The next step 192 is to get the frame data for the current frame as shown in step 192. When necessary, the loader loads the data for the current frame from the animation file as specified in the frame data block. The sequencer then constructs the frame from the data retrieved for the current frame as shown in step 194.

Figure 6:
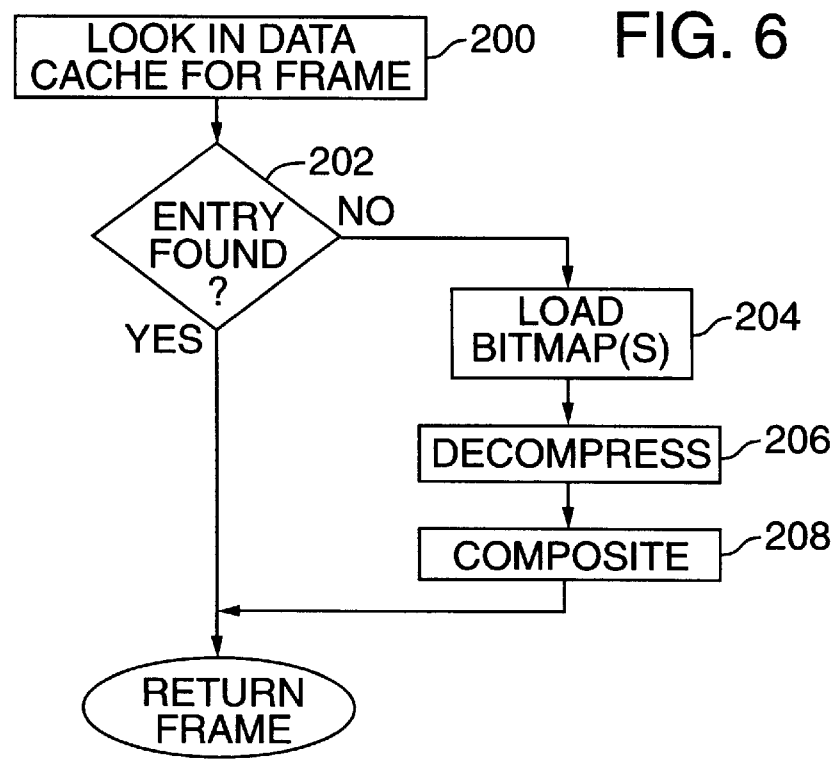
FIG. 6 is a flow diagram illustrating a method used to retrieve image data to construct a current frame of animation.

FIG. 6 is a flow diagram illustrating the method used to retrieve image data for the current frame. If the frame type is an image, the sequencer first looks in a data cache of frame bitmaps for an entry equal to the next frame's ID as shown in steps 200 and 202. The image data cache is a section of the computer's main memory where a fixed number of decompressed frame bitmaps reside in a most-recently-used queue (MRU). Data caching uncompressed frame bitmaps significantly improves overall performance of the animation system but the presence of such a cache is not essential for the correct operation of the system.

If sequencer finds the frame ID in the data cache, it returns with the constructed frame that is already in the cache as shown in the flow diagram. If there is no entry in the data cache for the current frame, the sequencer passes a request on to the loader to load the required bitmaps for the specified frame. Each animation frame can be made up of multiple layered bitmaps. The loader uses the data offset for the frame from the animation header block to read all of the compressed bitmaps that make up the frame from the animation data file into the computer's memory (see step 204, FIG. 6).

Once in memory, the loader decompresses the individual bitmaps and combines them into a single decompressed bitmap as shown in steps 206 and 208. The loader constructs a composite bitmap by performing bit block transfers (Bit Blts) from the decompressed bitmaps to an off-screen buffer, which holds a composite bitmap. This composite bitmap is first saved in the data cache and then passed back to the sequencer where it can be used in generating the current frame. If the sequencer had initially found an entry in the data cache for the specified frame ID, it could have retrieved the composited, decompressed bitmap for the frame from the data cache. This step eliminates the need to decompress and composite the animation frame when it has already been done recently.

Once the sequencer has generated the appropriate decompressed bitmap for the current frame, it can pass control to the regionizer, which computes a bounding region for the frame if the bounding region is not already available. The bounding region defines the non-transparent portion of the constructed frame. For a solid object like the genie in FIG. 2, the bounding region is the boundary of the genie. Some objects can have transparent regions inside of them, in which case the bounding region defines the non-transparent portion and also describes any transparent portion within an object as well. A constructed frame of animation can have a number of disparate pieces which are not necessarily contiguous. The step of computing the bounding region (210, in FIG. 4) can be computed in real time, which means that the bounding region does not need to be pre-computed. Instead, the regionizer can compute the bounding region as it constructs and displays each frame.

Figure 7:
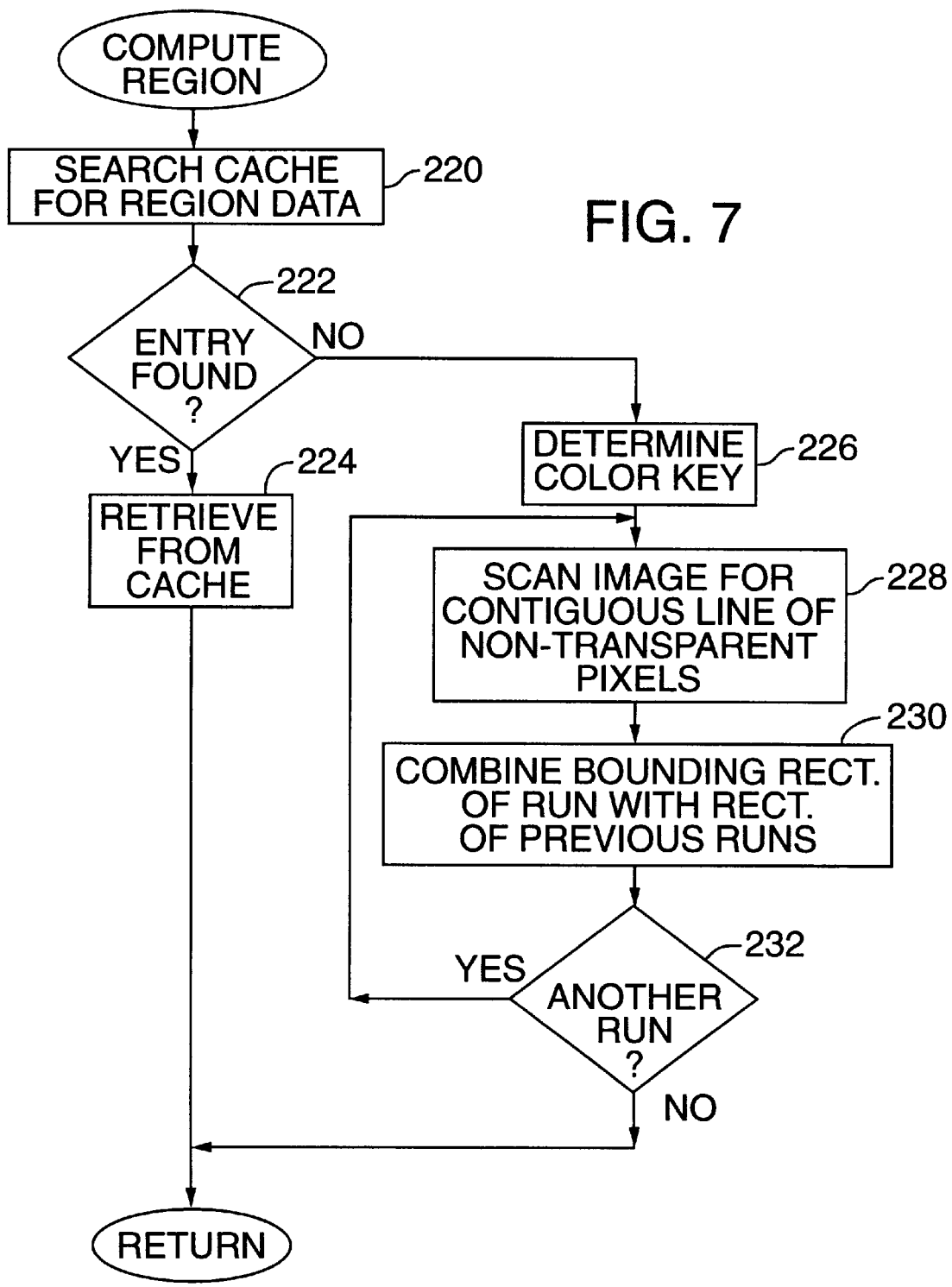
FIG. 7 is a flow diagram illustrating the process for obtaining the bounding region of an arbitrary shaped animation.

In this implementation, the regionizer takes one of three actions: 1) look in a region data cache to see if the region data is already present; 2) on faster computers, generate the bounding region in real time; and 3) on slower computers, load and use a pre-computed bounding region. FIG. 7 is a flow diagram illustrating the process for obtaining the bounding region.

The first choice for the regionizer is to attempt to retrieve the necessary region data from a region data cache in main memory of the computer as shown in step 220 of FIG. 7. This cache works similarly to the image cache in that it is a last-used-first-out queue. If the necessary data is found in the data cache it is retrieved (see steps 222, 224).

If it is not in the queue, two alternate pathways are possible. FIG. 7 illustrates the steps performed on a fast computer where the regionizer computes the bounding region in real time. The animation server is able to determine whether to compute the bounding region in real time by checking the computer's registry If the computer that the animation server is running on is deemed fast enough, the regionizer will compute the bounding region of the decompressed bitmap frame in real-time. In this implementation, the regionizer computes the bounding region as shown in FIG. 7 and described below. First in step labeled 226, the regionizer determines which color (the color key) the bitmap is using to identify its transparent portions. The first pixel in the frame's bitmap (i.e. the pixel at location (0, 0) in rectangular coordinate space of the bitmap where (0,0 is the upper left hand corner) is deemed special in that it defines the transparent color of the frame. The pixel value of this "transparent color" is sometimes referred to as the color key. Using this color key, the regionizer scans the bitmap one line at a time looking for contiguous runs of non-transparent color as shown in step 228. When it finds a run of non-transparent pixels it combines the bounding rectangle of the run with rectangles from previous runs 230. These rectangles always have a height of one, i.e. they are a single scan line of the bitmap, and have a width less than or equal to the total width of the bitmap. The operating system is responsible for combining the rectangles into non-rectangular regions in an optimized way. This process continues for every line in the bitmap until the entire bitmap has been completely scanned (as reflected generally by the loop back to step 228 from decision block 232). Upon completion, a single region is available that describes the bounding region of the animation frame.

On computer systems that are too slow to perform this type of processing in the time required by the animation server, the region data can be pre-processed during the animation development. The same process described above is used to generate the region data for each bitmap frame in the animation. The region data is then compressed and stored to a separate data file along with the animation data file. On slow systems, instead of generating the region data when it is needed, the data is simply read from a data file and decompressed. This method is far less CPU intensive than generating the region data in real-time which is important in low end PC systems. The disadvantage of this technique is that the region data for an animation can be quite large when stored to a data file, cannot be scaled (which is discussed further below), and is far less flexible in that it must be computed at the same time the animation is built. When the system is enhanced to support real-time rendered animations, this technique does not work because the bounding region needs to be generated in real time after the image has been modified, i.e. scaled, rotated, translated etc.

After the regionizer has retrieved the bounding region, either by generating it in real-time or by loading and decompressing it from a data file, it saves it in the region data cache for future use.

We now return again to the diagram in FIG. 4. At this point, the animation server has all of the components that are necessary to display the next frame of the animation in memory. The first step in rendering the animation frame is to position the region window at the appropriate location as specified by the frame's x, y coordinate in the frame data block (see step 240 in FIG. 4). Calls to the operating system, such as SetWindowPos in the Windows® Operating System, make this step possible.

The next step 242 is to set the animation frame window's region to the region generated by the regionizer. The operating system is responsible for sending the appropriate paint messages to any window that intersects with the previous region of the animation frame window so that this area can be redrawn. In response to receiving these messages, the application owning the window is responsible for repainting itself in the portion of its window altered by the animation.

One way to re-draw the portion of the desktop that is modified by the animation as it moves from frame to frame is to compute a bounding rectangle that encloses the animation in two consecutive frames and to re-compute the portion of the user interface that falls within this bounding rectangle. This bounding rectangle captures the animation in its current and previous frame. In other words, it includes the screen area once occupied by the animation in the previous frame as well as the screen area occupied by the animation in the current frame. The operating system instructs applications within this rectangle to redraw themselves. The portion of the desktop user interface within this rectangle is copied to an off-screen buffer. The animation server then instructs the operating system to draw the current frame of animation, clipped by its bounding region, to this off-screen buffer. Finally, the operating system performs a bit block transfer of this portion to the frame buffer to display the current frame of animation along with the re-drawn portion of the Windows desktop user interface, which is the background of the animation.

As shown in step 244 of FIG. 4, the animation server draws the decompressed, composited bitmap generated by the sequencer to the animation frame's region window. The operating system "clips" this bitmap to the bounding region of the window (which exactly matches the non-transparent pixels of the composited bitmap). The sequencer then sets an operating system timer to go off after an amount of time equal to the duration specified in the frame data (see step 246).

When the timer goes off, the entire process is repeated for the next frame in the animation. This is illustrated in FIG. 4 by the "timer up" message 248.

It is important to note that the animation system can display an arbitrary-shaped animation on top of the rest of the windows currently open on the display screen. In other words, the animation appears in the foreground of the display screen and is not confined to the window of a host application or of a client that has requested playback of the animation.

If the region data is being generated in real-time, animations can be scaled and played back at a size different from the size that the animation was originally developed at. The entire process as described above is essentially the same. The main difference is that the sequencer can scale the composited, decompressed bitmap returned by the loader using the specified scaling factor. The regionizer works on decompressed bitmaps stored in memory and needs no knowledge of the size of the original source of the bitmap or any scaling factor. The operating system can be used to perform scaling of bitmaps in an efficient manner. Once the bitmap is scaled it can be passed to the regionizer and the system works as described above. Allowing scaling of animations in real-time is important because it allows end users to have greater control over the look and feel of the system.

Another significant feature of this implementation is the way in which the animation's moving, non-rectangular window receives cursor device input from the user. Since the animation server repetitively updates the bounding region of the animation for each frame, the active area of the animation always corresponds to the non-transparent portion of the current frame. Thus, the operating system only notifies the server of cursor input (e.g. right and left mouse clicks) when the cursor is positioned within the non-transparent portion of the current frame. This form of interactive behavior enhances the effect of the animation operating outside the focus of any rectangular windows currently displayed on the Windows desktop user interface.

Second Implementation of the Animation System

The second implementation of the animation system is similar to the first animation system in that it generates arbitrary shaped animation and can also generate a bounding region for a frame of animation in real time. From the stand-point of the user, this implementation generates arbitrary-shaped animation with similar behavior as the first implementation. Namely, it produces arbitrary shaped animation and plays a sequence of animation in the foreground of the user interface such that the animation is not limited to a window of a host application or to a window of an application that requests playback of the animation. However, it has some differences: 1) the system does not load individual bitmaps and then construct each frame from separate bitmaps, but instead, loads constructed frames; 2) it does not cache region data in a MRU cache in main memory as above, but instead, caches all regions in secondary storage (e.g., on a computer's hard disk) as they are generated; and 3) it has the additional capability to pre-compute region data on a low priority thread.

Below we describe these and other implementation details. We describe this system using the example of an animated "character," an animation that has life-like gestures. One example of this type of character is the genie shown in FIG. 2. Although it is described using the specific example of an animated character, this animation system can be applied to other forms of arbitrary shaped animation as well.

The system first gets a request to open a character file. The file contains character, animation and audio data and is a structured storage file (see "Inside OLE" by Kraig Brockschmidt for a description) which contains all of the data necessary to play region window animations. At this time, the calling module can register itself to receive event notifications that describe the current state of the animation system at various times. Once the file is successfully opened, the character data stream is read into memory and the character is initialized. The data included in the character data stream includes the character's color table, an index into the color table that defines the transparent color (or color key), size information (i.e. width and height of the character frame), audio definition data, animation version information and any other data necessary for initialization of the character. A window is then created of the appropriate size but is not made visible until explicitly done so by the calling module (such as a client program to the animation server). A logical palette is created from color table information retrieved from the character data stream. The character is now initialized and is ready for animation requests.

Each animation is stored in a separate data stream in the structured storage file. When an animation is requested to be played, the system finds the appropriate data stream and begins loading it into memory. Animation data consists of a sequence of animation frame data. Frame data consists of all of the data necessary to render an animation frame to the display device. This consists of the actual image bits for the frame, as well as a duration, coordinate offsets, frame branching logic, and lip-synched mouth image data (described further below). If the image bits are in a compressed format they are decompressed. Note that in this implementation, the frame is already constructed in the sense that it does not have to be assembled by combining more than one bitmap. As demonstrated in the first implementation, it is possible to construct frames in real time as opposed to using pre-constructed frames.

After the animation data has been successfully loaded and decompressed, the animation can be played. The animation is played by first rendering the uncompressed frame image data for the next frame to an offscreen video memory buffer. The animation system then creates a window region from the buffer that defines all areas of the image that are non-transparent. The algorithm for creating the region is as follows:

```
ImageRegion = empty
for each scan line in the image
    for each run of non-transparent pixels in the scan line
        create a rectangular region of height one
        combine the region with ImageRegion
    end loop
```

It is important to note that the above method also works for images that contain either "holes" or more than one disjoint region. A "hole" is a transparent region completely surrounded by a non-transparent region. A disjoint region is any non-transparent region completely surrounded by either transparent pixels or the boundaries of the image. "Holes" can contain any number of disjoint regions within themselves. The image region is defined to be the list of non-transparent regions. The image region is analogous to the "bounding region" described in the first implementation and the terms can be used interchangeably. In both cases, the region defines the location of non-rectangular, non-transparent image portions whether or not they comprise a contiguous group of pixels or disjoint groups of contiguous pixels.

Once the image region is generated, the operating system is called to assign the region to the window. The operating system is responsible for clipping all input and output to the region associated with a window. After the region has been set, the image data can be copied from the offscreen memory buffer to the display device, using the operating system's bit block transfer, where it will be clipped to the bounding region assigned to the window. The Windows Operating System, for example, has an application programming interfaces (APIs) that support bit block transfers to offscreen buffers. Input and output are clipped to the list of (possibly) disjoint regions that make up the image region.

After the frame image is rendered to the display device, an operating system timer is set to go off in the amount of time specified by the frame's duration. When the timer goes off, the animation system must determine the next frame to render. If the frame contains no branching logic, the system determines if it is the last frame in the animation and notifies the calling module of the completion (if the module registered itself to receive event notifications). If it is not the last frame, the next frame is either the next frame in sequential order, or the frame specified in the branching logic for the current frame.

Branching logic is defined by specifying a frame number to branch to and a percentage of time that the branch should be taken. Multiple branches can be defined as long as the total percentage does not exceed 100%. The first branch is given a branch probability between 1 and it's percentage. Subsequent branches are given a probability between the maximum probability of the previous branch plus one to that value plus their percentage. To determine which branch to take, the animation system generates a random number between 1 and 100 and starts searching sequentially through the frame branches until it finds a branch whose maximum probability is less than or equal to the random number. If no branch can be found, the next sequential frame is selected.

Once the next frame number is known, the system can repeat the process of rendering, region generation, and displaying of the frame image data. The repetition of this process is an animation.

The generation of the region data for an animation frame in real-time is "expensive" in terms of CPU cycles. Thus a system of region caching has been implemented. It would be beneficial if the region data could be processed at character development time and saved along with the character animation data. This is possible but has serious limitations. If the region data is pre-processed, the character can not be scaled at run-time. The character data file also has to store all of the region data for every frame in every animation. The data can be quite large. This is not a problem when the entire character data file resides on the local machine running the animation system. However, the animation supports incremental downloading of animation data over low bandwidth communication lines such as the Internet. Downloading the region data for a character would be extremely slow. Thus a hybrid approach to region generation is used in this alternative implementation. The approach minimizes the download time associated with a character data file and minimizes the CPU cycles needed to generate regions in real-time.

When a region for an animation frame needs to be rendered, the system will first look in a local storage cache of regions for a match. In contrast to the fixed sized MRU cache in the first implementation, this cache is located in secondary storage, i.e. the hard disk. If the region is found it can be loaded from disk very fast and assigned to window as described above. If the region is not found, it is generated in real-time and used as described above. However, after the region is used it is saved to the region cache on disk. The next time the region is required it can simply be read from the cache instead of being generated in real-time. Thus, the system gets the benefit of the pre-computed region without it having to have been downloaded over a possibly low bandwidth communications link. This gives the system the appearance of improved performance over time, i.e. the more frames that are displayed (which results in region generation and thus caching), the better the performance.

The system can also pre-generate regions on a low priority background thread when the animation system is idle. When the character is loaded, the region generation thread is started in a suspended mode. Whenever the system is idle, it resumes the thread (in low priority) which starts generating regions for any animation frame that does not already have an entry in the cache. The thread runs at a very low priority so that it does not unnecessarily steal CPU cycles from other applications currently running. The thread is suspended when the animation system becomes active. Over time, every animation frame in the character data file will have a pre-computed region in the cache. Once this is accomplished the region generation thread can be terminated.

On low-end systems that are simply not capable of ever generating regions in real-time, the computation of regions must be done before the system can be used. This can be done at character installation time when the user commonly expects a delay.

Regions are directly linked to frame images at a given scale. The default scale of an animation frame is 100%, i.e. the frame should be displayed at its actual size. The animation system supports scaling of animations. This has the advantage that animations can be played at a size that is relative to the resolution of the display being used. This is necessary to overcome the problem that an animation created at a certain size looks bigger or smaller depending on both the resolution and physical size of the display device.

Caching region does improve performance by reducing the need to re-compute region data. However, if the user or a client application wishes to scale an animation (enlarge or reduce its screen size), cached region data cannot be used because it is the wrong size. Therefore, when the scale of an animation changes, all pre-computed regions are deemed unusable and must be recomputed. Thus, the entire region cache must be flushed and regenerated. The region generation thread must be restarted or reset (if it is still running). This process is quite expensive but is acceptable because scaling is something that users will typically do infrequently.

The animation system supports the incremental downloading of animations from a remote site. This is extremely beneficial for running the system over low bandwidth communication links. When a character is loaded from a remote site, only the character data stream is initially downloaded. The character data stream contains all of the data necessary to initialize the character. If a character data stream already exists on the local machine, the downloaded data is compared to the local data to determine if any animations currently stored locally have been superseded by a newer version on the remote site. If so, those animations are marked so that if a request for the animation is made the system knows that it must retrieve the newer version from the remote site. No animation data is downloaded. The character data stream is typically very small so the system can be initialized quite quickly. When a request for an animation is made, the system looks in the character data file on the local storage device. If the animation is found, it is loaded and played as described above. If the animation is not found it is downloaded from the remote site. Once the download is complete, the animation can be played as described above.

It is desirable for calling modules (e.g., clients) to have control over when animations get downloaded. For instance, the calling module may want to download several animations that are played in sequence. If none of the animations reside locally, the system would download the first animation, play the animation, download the next animation, play it, etc. This is obviously not the desired effect. Thus, the animation system allows callers to download sets of animation. When a calling module requests an animation to be downloaded, the system first checks to see whether or not the animations reside locally. If it does, the system simply returns. If it does not the system begins the process of downloading the animation from the remote site. It can do this in an asynchronous fashion specified by the calling module. The system also supports a notification API so that calling modules can download animations asynchronously and then be notified when they have been downloaded. Thus in the example above the calling module could do the following:

```
Request = Get "Animation 1", Get "Animation 2",
Get "Animation 3"
    On Request Complete
    Play "Animation 1"
    Play "Animation 2"
    Play "Animation 3"
```

This results in a request for the three animations to be downloaded at the same time. The Request Complete event indicates that the animations all reside locally and can be played one after another without any delays. Animations do not have to be explicitly downloaded. If an animation is requested that is not stored locally, the system adds an implicit download call. The above scheme also works for audio data files that may be associated with an animation.

Asynchronous download calls are always temporarily interrupted by synchronous calls. Thus if the calling module asynchronously downloads an animation and a synchronous animation request is generated as a result of end user interaction, the synchronous requests gets priority. This follows the notion that the end user really is in control of setting the priority for animation downloads.

As demonstrated by the alternative implementations described here, there are a number of different ways to implement the animation system, and therefore, it is not limited to these specific implementations. The cache for region data in the first implementation is a better design in cases where the same animations are used repeatedly in a short period of time because the MRU cache is more fully utilized, and it is quicker to read region data from main memory rather than retrieve it from secondary storage. However, it is often more likely that clients will make requests for different animations, rather than make repeated requests to play a small number of animations over and over. In these cases, the second implementation has better performance because all region data is cached in secondary storage as it is computed, rather than being limited to a fixed size MRU cache. Since region data is computed in real time along with an animation request and is also pre-computed before a request using a background thread, the second implementation will approach a cache hit rate of 100% over time. Depending on the desired performance and the nature of the animation requests, an animation system can be implemented using different combinations of the features described above to optimize performance.

While it is not necessary to use a client-server approach for providing animation services, the client server architecture has the advantage of making interactive animation services available to a variety of different types of clients. One specific application of this animation technology are animated, interactive user interface characters. In a client server architecture, clients can request the server to create and play an interactive character on top of any window in the Windows desktop. In addition, a number of clients can share a single interactive character.

It is important to point out that there are other possible implementations of an animation system. For example, one can abstract the general method described in the previous sections with a client/server architecture. In this abstract form, the processes used to draw animations on the screen are divided into two separate classes of operation. The file I/O, the cache, and all other data used for generating the character animations are accessed through an OLE COM server called an "animation data provider." The regionizer and the sequencer reside in a client. (This client can, in turn, provide services to other programs on the computer.) This abstract representation allows the animation system to use bitmaps that are represented in arbitrary formats on secondary storage. It also allows the animation system to provide smooth transitions from one posture to another for arbitrary animated characters. This frees the system from any fixed character file format, as well as reducing the dependence of the animation system on the Windows® operating system.

In one implementation of this client/server architecture, the animation system calls into the animation data provider through certain COM interfaces. Significantly, this implementation of the client/server architecture does not depend on any particular file format. It only depends upon the animation data provider's ability to construct bitmap representations of the current frame of the animation of the character, and to pass those on to the server at a relatively high speed. These COM interfaces allow the animation system to obtain information about the character in general, as well as information about the specific poses of the character. Thus, they provide access to all of the character's properties, including its name, its size, the number of bit planes in each animation bitmap, as well as to the animation bitmaps themselves. In addition, these COM interfaces allow the animation system to pass provider-defined state information to different animation data providers. This state information can be encoded in a form that only those data providers understand, providing a degree of protection for the content of the character. Finally, these COM interfaces are optimized to reduce the costs of accessing this data. This optimization is necessary in order to handle the case of an application client with a dedicated animation data provider. It has two parts. First, animation data providers can support standard OLE COM interfaces through which their persistent state can be captured so that each instance of an animation data provider can be reconstituted inside the server process. In addition, the COM interfaces used specifically to provide animation data are optimized to store and pass that data in a format particularly well-suited to transfer across process boundaries.

Animation Server Implementation

The animation services described above are implemented as Component Object Model (COM) based OLE Automation Servers. For a detailed discussion of OLE see Inside OLE, Second Edition by Kraig Brockschmidt, Microsoft Press, Redmond, Wash. 1995. The COM server implements a set of animation services that can be used by an unlimited number of clients, which are typically application programs. These clients can connect to the server directly, through a C/C++ style COM Application Programming Interface (API), or via an ActiveX Control providing an OLE Automation interface. The ActiveX control allows access to all of the functionality of the COM server while providing an interface that is easy to use and abstracts the COM server's interface to a higher level.

COM Object Overview

In general, an "object" is an instance of a programmer-defined type referred to as a class, which exhibits the characteristics of data encapsulation, polymorphism and inheritance. A "class" is the definition of a data structure and the functions that manipulate that structure (member functions).

Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. Programs that wish to use an object do not access the object's data directly, but must instead call functions on the object's interfaces to operate on the data. An interface is explained further below, but in general, is a group of related functions that a program can invoke to access an object's data.

Polymorphism refers to the ability to view (i.e., interact with) two functionally similar objects through a common interface, thereby eliminating the need to differentiate between two objects. Inheritance refers to the derivation of different classes of objects from a base class, where the derived classes inherit the properties and characteristics of the base class (which for purposes of OLE are the interfaces of the base class).

Figure 8:
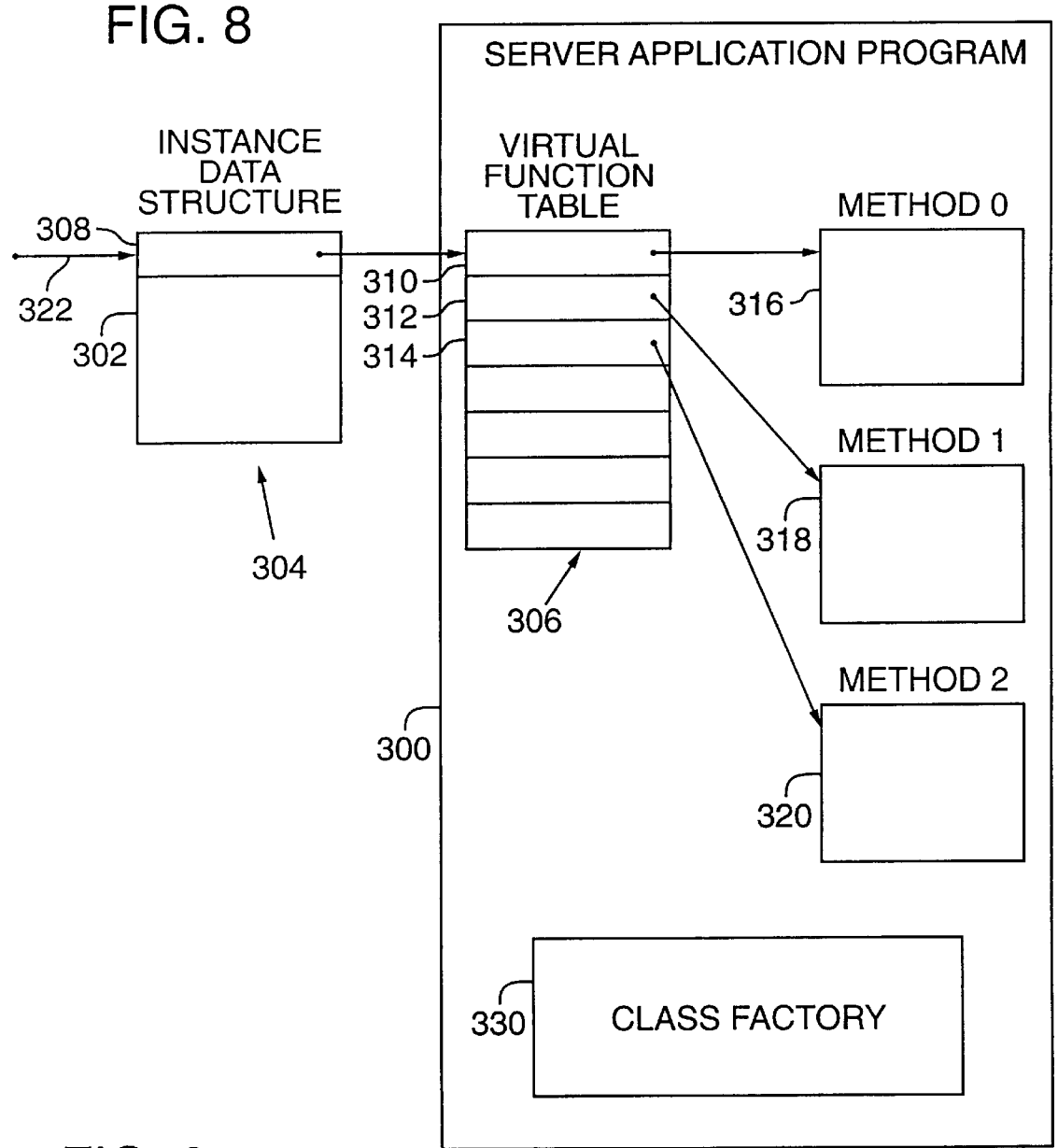
FIG. 8 is a diagram illustrating an example of a COM server and its relationship with an instance of object data.

OLE's COM specification defines binary standards for objects and their interfaces which facilitate the integration of software components. FIG. 8 is a diagram illustrating an example of a COM server 300 and its relationship with an instance of object data 302. According to the COM specification, an instance of an object is represented in the computer system 20 (FIG. 1) by an instance data structure 304 and a virtual function table 306. The instance data structure 304 contains a pointer 308 to the virtual function table 306 and data 302 (also referred to as data members, or properties of the object). A pointer is a data value that holds the address of an item in memory. The virtual function table 306 contains entries 310–314 for member functions 316–320 implemented in the server. Each of the entries 310–314 contains a reference to the code 316–320 that implements the corresponding member function.

An interface to an object is a group of semantically related functions that are publicly accessible to software that wishes to use the object (e.g., a client program). The interface is implemented in the computer memory as a block of the memory containing an array of function pointers, illustrated as the function table 306 in FIG. 8. The interface's definition are the names for each function in the virtual function table. An object may support more than one interface. If an object supports more than one interface, the object has a function table and corresponding set of related functions for each interface.

Client programs interact with the object by obtaining a pointer (referred to as an interface pointer) 322 to the pointer 308 of the virtual function table 306. OLE includes a type definition of an interface pointer which allows client programs to call member functions on the interface by name through the interface pointer and provides type checking on the function's arguments, as expressed in the following code (in the C++ programming language):

pInterface->MemberFunction( . . . )

By convention, the interfaces of an object are illustrated graphically as a plug-in jack. Also, interfaces conventionally are given names beginning with a capital "I. " Objects can include multiple interfaces which are implemented with one or more virtual function tables. The member function of an interface is denoted as "IinterfaceName::FunctionName."

Figure 9:
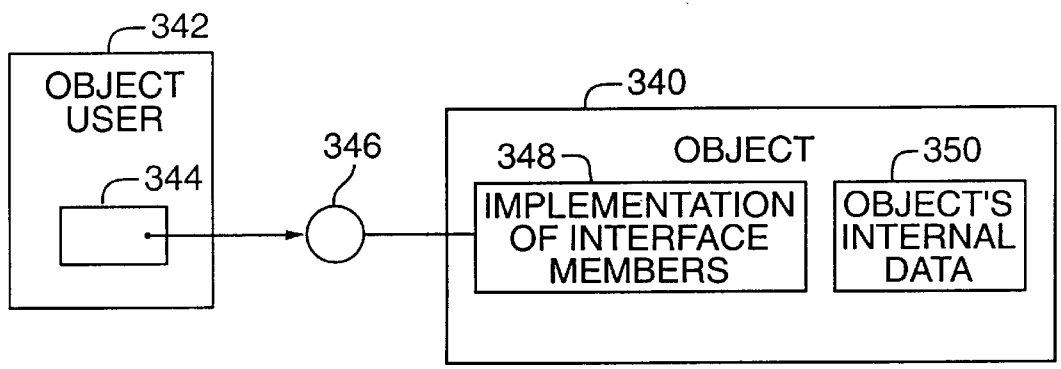
FIG. 9 is a conceptual diagram illustrating the relationship between a COM object and a user of the object (such as a client program).

FIG. 9 is a conceptual diagram illustrating the relationship between a COM object 340 and a user 342 of the object (such as a client program). The user of the object has a pointer 344 to the one of the object's interfaces, which is represented by a plug-in jack 346. The object includes code 348 implementing the member functions in the object's interface, and it also includes the encapsulated data 350, accessible via the object's interface. An OLE server, such as the animation server, can include a number of interfaces which allow clients of the server to access an instance of an object, such as an interactive animation encapsulated within an object.

The object conforming to the COM specification exhibits data encapsulation by exposing its interfaces to client programs. The client programs interact with the object by calling the member functions 348 on a particular interface of the object, but do not directly manipulate the object's data 350. A COM object also exhibits polymorphism and inheritance in that it can provide interfaces in common with a base class and other similar objects, so that client programs can interact with each of the objects in the same manner by calling member functions of the interface that the objects have in common.

OLE Server Overview

To describe an "OLE server," we turn again to the example in FIG. 8. The virtual function table 306 and member functions 316–320 of the object are provided by a server program 300 which is stored in the computer system 20 (FIG. 1) as an executable program file (with a ".exe" file name extension) or as a dynamic link library file (with a ".dll" file name extension). Dynamic link library files are loaded, dynamically linked, and executed by the Windows® operating system in a same process with a client application program. Executable program files are loaded by the operating system as a separately executing process. In the OLE specification, the server application 300 includes code for the virtual function table 306 (FIG. 8) and member functions 316–320 (FIG. 8) of the classes that it supports, and also includes a class factory 330 that generates the instance data structure 304 (FIG. 8) for an object of the class.

A server program can be written by a programmer to support a particular class of object that contains any desired data. The animation server, for example, provides objects representing an interactive animation. This allows a client program (such as the clients shown in FIG. 3) to interact with the interactive animation through interfaces of the OLE object.

For the client program to interact with an instance of a COM object provided by the server 300, the server must first create the object (i.e., instantiate an object of a class supported by the server application) and the client must gain an interface pointer to the object (pointer 322, for example). In OLE, the client program realizes these events using services provided by OLE and a set of standard object interfaces defined by COM based on class and interface identifiers assigned to the object's class and interfaces. More specifically, the services are available to client programs as application programming interface (API) functions provided in the COM library, which is part of a component of the Windows® operating system in a file named "OLE32.DLL. " In OLE, classes of objects are uniquely associated with class identifiers ("CLSIDs"). Class identifiers are 128-bit globally unique identifiers ("GUID") that the programmer creates with an OLE service named "CoCreateGUID" and assigns to the respective classes. The interfaces of an object are associated with interface identifiers ("IIDs").

In particular, the COM library provides an API function, "CoCreateInstance," that the client program can call to request creation of an object to encapsulate a particular character's data using a CLSID associated with the data. The CoCreateInstance API function creates an instance of the object and returns a pointer of the requested interface to the client program.

Once the client program has obtained a first interface pointer to the object, the client obtains pointers to other desired interfaces of the object using the interface identifier associated with the desired interface. COM defines several standard interfaces generally supported by OLE objects including the IUnknown interface. This interface includes a member function named "QueryInterface." The QueryInterface function can be called with an interface identifier as an argument, and returns a pointer to the interface associated with that interface identifier. By convention, the IUnknown interface's member functions are included as part of each interface on an object. Thus, any interface pointer that the client obtains to an interface of the object 80 can be used to call the QueryInterface function.

As noted above, the animation server is implemented as an "OLE Automation server." The term "automation" in this context refers to how the OLE object exposes a set of commands or functions that another piece of code can invoke. OLE automation enables an application to control another application's objects programmatically. In other words, automation provides a way for a program to manipulate an application's objects from outside the application.

In OLE automation, a software object exposes itself as a series of methods, properties and events. A property is an attribute, such as a color, the zip code section or the postal code section of an address, or another object. A method generally refers to a request to an object to perform a specific action. Finally, an event is a notification from an object that something has happened. An event is similar to a method call except that it occurs from the object to its client.

Properties have data types. For example, the postal code section of an address can be a string or a long integer. Properties can also be parameterized, which is useful to construct an array of one type representing a collection of properties (e.g., the lines of an address). In this type of property, a parameter representing an index in the array is defined for the property. Methods can also take parameters and return results.

OLE automation also allows for hierarchies of automation objects by allowing methods and properties to return pointers to other objects. For example a series of related attributes can be represented within an object, which represents each of the attributes as a property.

In OLE, a software object's properties and methods can be exposed to outside applications through 1) a standard OLE interface called IDispatch, and 2) through interface methods and property access functions that applications can call directly. IDispatch provides outside access to an object's methods and properties through one of its methods called the Invoke method. For instance, a program can ask an OLE object to return a property or can call one of its methods by calling the Invoke method on the IDispatch interface of the object and identifying the property or method by its ID. The IDispatch interface includes other methods to enable a program to get an ID of a method or property, and to get data type information. An OLE object can expose methods that can be called directly, rather than through the Invoke method in the IDispatch interface. For example, an OLE object can expose a set of functions that is derived from IDispatch and includes method and property access functions that another program can call directly. This is sometimes called a 'dual' interface because other programs can invoke an object's methods through the Idispatch interface and directly through this second type of interface.

An OLE control is a type of OLE object that uses OLE Automation to expose properties and methods and to provide support for events. An OLE control object is typically designed to be incorporated into a host application called a container. In the context of OLE controls, an event is a notification from the control to its container that something has happened. In OLE controls, events are typically implemented as standard OLE automation methods, except that the automation interface for these methods is implemented in the container, not the control. When a control wants to fire an event, it calls the container method associated with the event. For instance, the control can call the proper container method to fire the event through the IDispatch:: Invoke method of the container.

An OLE object can tell another object that it is the consumer of the other object's interface through a mechanism known as a connection point. A connection point is an interface exposed by an object that is used to hook up to an implementation of an interface with which the object wants to communicate. In the case of control events, a control describes the event interface in terms of an OLE automation interface in its type library, marking the interface as "source." This means that the control does not implement the interface. The control then provides a connection point through which the container can connect its implementation. A connection point can be defined as an implementation of the IConnectionPoint interface. The container gets the connection point through another interface called IConnectionPointContainer, which allows an external object to iterate list of connection points maintained by a control.

The Animation Server

Figure 10:
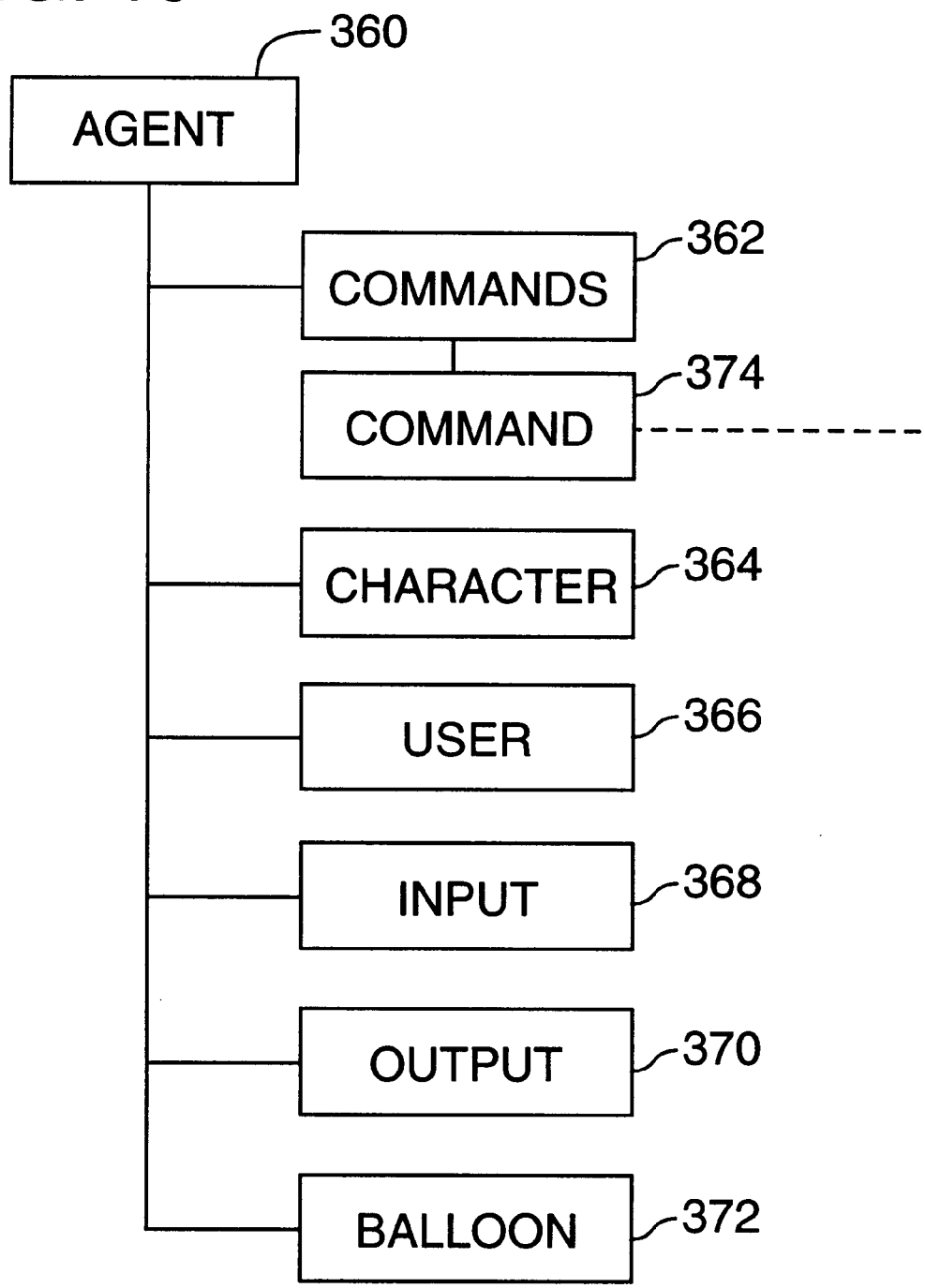
FIG. 10 illustrates the relationship among the different types of objects supported in the animation server.

The animation server shown in FIG. 3 is implemented as an OLE Server. FIG. 10 illustrates the hierarchy of the objects supported in the animation server. The top level object is the agent object 360, which represents an interactive, animated user interface character called an agent. An example of this type of character is the genie in FIG. 2.

The other objects include a commands object 362, character objects 364, a user object 366, an input object 368, an output object 370 and a balloon object 372. The commands object can have several command objects 374, which represent individual input commands that a client has specified for an agent.

Below, we describe the methods, properties and events that make up the interfaces to the objects supported in the animation server. Clients can include code that directly invokes the objects implemented in the animation server using ActiveX (OLE) interfaces. Alternatively, a client can access the methods, properties and events of the objects implemented in the animation server through an OLE control representing an animated character. For example in the Visual Basic Programming Environment from Microsoft, software developers can insert an OLE control representing an animated character into a Visual Basic form. The Visual Basic programming environment gives the developer high level access to the methods, properties and events of the animation server using conventional Visual Basic syntax. A description of examples of the methods properties and events that OLE controls expose follows below.

The OLE control acts as a high level programming interface to the animation server. When a piece of code, such as a Visual Basic application program, invokes a method or property on the OLE control, the OLE control routes the method or property request to the corresponding method or property in the animation server. The OLE control, thus, acts as a thin software layer that enables programmatic access to the methods and properties of the software objects in the animation server. The Visual Basic programming environment also provides support for receiving event notification from the animation server. When the developer inserts a control representing a character into a Visual Basic form and creates a Visual Basic application, the Visual Basic programming environment adds the necessary support for receiving event notification to the application. This event notification mechanism is similar to the event notification mechanism used to communicate events from an OLE control to a container of an OLE control.

In a typical implementation of a Visual Basic application that includes an animated character control, the operating system dynamically loads the character control in the process space of the application. The Visual Basic application can access the methods and properties of the control, which in turn, accesses the corresponding methods and properties in the animation server running in a separate process.

The OLE control based design also enables developers to create script code in Visual Basic Script that accesses the methods, properties and events of the animation server through the OLE control interface. One important use of this technology is adding an animated character to an HTML document and controlling the character through script code in the document. In this particular use of the invention, the HTML document is parsed and rendered by an application program, such as an Internet browser application. In one possible implementation, the browser loads the character control in its process space when it encounters an object identifier in the HTML page corresponding to the character control. When it encounters the script code in the HTML page, the browser uses an interpreter, loaded in its process space, to translate the script. To execute the script and allow it to access the animation server, the browser control communicates requests to access methods and properties to the interface of the in-process control, which in turn, accesses the corresponding methods and properties in the out of process animation server.

It is important to note that these uses of the animated character control are only examples. The invention does not necessarily require that the animation server be accessed through an OLE automation interface. There are alternative ways to access an out of process animation server, and the use of an OLE control is just one possible method of programmatically accessing the animation server.

We now turn to specific examples of the methods, properties and events of the objects implemented in the animation server.

The Agent Object

Clients of the animation server access its animation services using the methods, properties and events of the agent object's interface. The methods of the agent object include a number of functions to control the playback of an animation. Example methods include: Play, GestureAt, MoveTo, and Stop.

Play—A client invokes this method to ask the server to play a specified animation sequence. The client specifies the animation sequence by passing a string that specifies the name of the animation sequence.

GestureAt—Clients use this method to cause the animation to gesture at a specified location. When a client invokes this method, it provides two integer values representing the screen coordinates (x,y) in pixels where the character should gesture at. The character author assigns animations corresponding to different coordinates to this method, and at runtime, the server determines which of these animations to play based on the current location of the character and the coordinates specified by the client.

MoveTo—This method moves the animation to a specified location in screen coordinates.

Stop—Clients invoke this method to halt the current animation and play the next animation queued in the server.

Agent Object Events

In general, events are notifications from the animation server that something has happened for which a client should be notified. They, for the most part, are asynchronous, but in some cases can be synchronous. In this context, asynchronous means that the piece of code that monitors the event spawns a separate thread to fire the event so that the code can continue processing after it fires the event. Synchronous means that the piece of code that monitors the event does not spawn a separate thread to fire the event but instead, fires the event on the current thread of execution and waits until the event is processed before continuing. In the case of the animation server, the server is responsible for firing events to clients, whether they are application programs or a character control within an application program (such as a Visual Basic application) or a script (such as a Visual Basic Script embedded in an HTML document). In the latter case of a character control, the control acts as a gateway for communicating events.

Most of the events generated in the OLE implementation of the animation server are asynchronous, meaning that they spawn a separate thread to fire an event. This is beneficial to performance because the animation server can continue executing without waiting for the client to finish processing an event. However, some events, like ServerShutdown, are synchronous because it is important for the server to wait for the client to finish processing the event before continuing.

One form of event notification is a callback function where the client requesting notification of an event provides the name and location of a function to call when a predefined event occurs. For example in OLE, this callback can be implemented as an IDispatch interface of the client that the animation server can invoke when it detects an event has occurred. For asynchronous events, the callback function is made on a separate thread of execution, while for synchronous events, the callback is made on the same thread.

The agent object's events allow the client program to track the state of an agent. Examples of these types of events include:

InputActivate event—The server generates this event when a client becomes active for input from the server.

InputDeactivate event—The server generates this event when a client has been deactivated for input from the server.

The server uses the activate and deactivate events to arbitrate among requests from clients for animation services. The active client is the client that receives mouse and speech input from the server.

Command event—This event occurs then the user chooses an input command of an agent (e.g., clicks on the agent's command window).

The command event tells the client which input command the user has provided by specifying a command object. The command object provides access to a number of properties of the command including the command ID.

ServerShutdown event—This occurs when the server shuts down.

The Character Object

The character object provides access to the properties of a character. These are not the same as the properties of the control. The user can change the properties of a character, but the values of these properties are read-only to client applications to avoid arbitrary changes to the user-specified settings. The properties of a character include:

Height—This property is an integer representing the height of a character in pixels.

Width—This is an integer representing the width of a character in pixels.

Left—This property is an integer that specifies the left edge of the current character frame. The Left property is expressed in pixels, relative to screen origin (upper left).

Top—This property is an integer that specifies the top edge of the current character frame. The Top property is expressed in pixels, relative to screen origin (upper left).

Even though the character appears in an irregularly shaped region window, the Height, Width, Left and Top properties of the character are based on the external dimensions of the rectangular animation frame used when it was created. Clients use the MoveTo method of the agent to change the character's position.

The Input and Output Objects

The input and output object provide read only access to an agent's input properties and output properties.

The Commands Object

The commands object enables clients to specify a collection of commands that an agent object will respond to when a client becomes active. The server maintains a list of commands that are currently available to the user. This list includes commands that the server defines for general interaction, such as Stop Listening and Go Away; the list of available (but inactive) clients; and the commands defined by the current active client. The first two sets of commands are global commands; that is, they are available at any time, regardless of which client is active. Client-defined commands are available only when that client is active.

Each client application defines a collection of commands called the Commands object. To add a command to the Commands object, the client uses the Add or Insert methods of the commands object. For each command in the collection, the client can specify whether the user accesses the command through the Commands window, the application's (including Web page's) own interface controls, or both. For example, if the programmer wants a command to appear on the Commands window, she sets the command's Caption and Visible properties.

The client can also set the Voice property for a command, which enables its selection through speech recognition.

The client can add separator lines to a Commands object to group sets of commands in the Commands window. The client can also remove commands and separators.

Here's an example using VBScript, where Agent1 is the name (ID) for the agent control:

Agent1.Commands.Add "GetTime", "Current Time", "what's the current time"

Agent1.Commands.Add "GetDate", "Current Date", "what's the current date"

Agent1.Commands.Add "GetName", "Current Name", "what's your name"

In this example, the first line of code first disables the commands by setting the Enabled property to false. The following lines invoke the Add method to add commands to the commands window of the agent.

The server supports the following methods for the Commands object: Add, Insert, Remove, and RemoveAll.

The Add method adds a command to the Commands object. The client can also specify the caption, visual state, and enabled state for the command.

The Insert method inserts a command in the Commands object. The client specifies the command ID of the command to be inserted, a name of the command object to which the new command is related to, and value indicating whether the command should be inserted before or after the related command. The client can optionally specify a text string that will appear in the Commands window for the inserted command when the client is active.

The Remove method removes a client command object (command or separator) from the Commands object. The client specifies a string value corresponding to the ID for the command or separator.

The RemoveAll method removes all client command objects (commands and separators) from the Commands object. Command objects that are removed from the collection do not display when the agent control is active.

The server supports the following properties for the Commands object:
Caption, Count, Enabled, Visible, and Voice.

The Caption property is a text string describing the text displayed for the Commands object in the Commands window.

The Count property returns an integer (read-only property) that specifies the count of commands in the Commands object.

The Visible property is a boolean value that determines whether the agent's Commands caption is visible.

The Command Object

A command is an item in a Commands collection. The server provides access to the commands specified by a client when the client is active.

For each command that the client specifies, it can define whether it will be accessible in the Commands window by using the Caption, Visible, and Enabled properties.

In addition, the client can set the words or phrases that it wishes the server to use to match speech input for a command.

When the server receives input for a command object, it sends a Command event, and passes back the name of the command as an attribute of the UserInput Object. The client can then use conditional statements to match and process the command.

Properties of the Command Object

Each command defined in a Commands object also has properties that affect the how the server presents the command. Individual commands in a Commands collection have a Visible property. When this property is set to True, the command will appear on the agent's pop-up Commands window. A client does not have to include any or all of your commands in the agent's Commands window, if it already provides its own interface for those commands. For example, a form may already display controls that enable user interaction. In this case, the client would not need to include access on the agent's Commands window, yet it can still provide speech access to those controls (by defining command objects for those fields).

The following Command properties are supported: Caption, Enabled, Visible, and Voice.

The Caption property determines the text displayed for the command in the Commands window. The property is a string expression displayed as the caption for the command.

The Enabled property indicates whether the command is currently enabled. The property is represented as a boolean expression specifying whether the object is visible or hidden. If True, the command is enabled. If False, the command is disabled.

The Balloon Object

The word balloon object provides a way for the server to display text output to the user. The Enable property of this object is used to determine whether or not the server will display text output.

Interaction Between Animation Server and Clients

Having described an implementation of the animation server, we now describe how the server interacts with clients requesting animation services.

The first step that a client performs is to attach to the server. This is performed using a standard OLE mechanism which starts the server if it is not already running. The server maintains a list of all connected clients and terminates when either the last client detaches or it is explicitly shut down by the end user. This functionality is consistent with the COM specification.

Once the server is started, the client continues with the process of attaching by registering a notification interface with the server. The notification interface is used by the server whenever it needs to communicate either events or state changes with its connected clients. Notifications from the server to connected clients always occur on a separate thread of execution in the server. This is necessary in order to prevent any single client from blocking the server while it is processing a notification.

As part of this initial connection process, the client selects a character that it wishes to connect to.

Once a connection to a character is established, clients can request services from the agent server. These services consist of region window animations, synthesized digital audio output, and input command processing. The animation services allow clients to trigger animation sequences in the agent. To accomplish this, the client calls the Play methods on the agent object's interface.

The agent is a shared resource and thus a prioritization scheme must be implemented to determine which receives mouse and speech input. To solve this problem, the server introduces the notion of an input active client. The input active client is the only client that receives mouse and speech events from the server at any given time. The input active state of a client can be set by either the end user (if the client allows it) or the client itself Only one externally connected client is considered input active at any time. The server also implements what are known as internal clients. These clients typically follow the same rules as external clients but can override the default behavior of the server if deemed necessary.

Whenever a client becomes input active it is sent a notification from the server in the form of an InputActivate event. This activation is analogous to a window gaining the input focus in the Windows® Operating System. Upon activation, the client receives speech and mouse events from the server. The active client will also be sent a notification (i.e. an InputDeactivate event) from the server when it is about to become inactive (analogous to KillFocus).

Clients can explicitly make themselves active however they should always be prepared to handle the case that another client has "stolen" the activation focus from them. This model works because it is ultimately the end user that is controlling which client has the chance to become active through either direct communication with the server or one of its connected clients.

The agent server allows for asynchronous queuing of animation requests.

If there are no requests, the server enters what is referred to as its idle state. When the server is idle, it causes the agent to play one of its idle animations picked at random. Before playing an idle animation, the server will first try to play a transitional animation to smoothly move the agent from its current position to a constant position known as the rest pose. All idle animations begin at the rest pose. Transitioning the agent through a constant position reduces the amount of jerkiness associated with quickly changing the state of the agent. This gives the agent a more natural feel. The server's idle animations will always be interrupted by an incoming client request.

If there are requests in the queue, the next request is popped off of the queue and the appropriate action is taken by the server. This process continues until the request queue is empty. Because of the asynchronous nature of the agent's playback mechanism, it is important to implement a method that allows clients to notify themselves when a particular event has been triggered in the server. This is necessary for synchronizing events in the server with events in the client.

Consider the example where a client wants to play an animation that causes the agent to gesture at a particular location on the screen, display its own window, and then have the agent speak something to the user.

The server implements two mechanisms for allowing clients to synchronize their own actions with the servers. The first allows clients to add specific notification requests to the server's request queue. The server will process these notification requests with the same rules that it processes animation or audio requests. When the server encounters a notification request in the request queue, it simply sends the notification to the client that posted the request. This type of notification is acceptable for many synchronizing functions.

The other mechanism allows clients to embed notification requests in text that is to be synthesized into digital audio output. This type of request offers a finer granularity than the previously described mechanism in that it allows clients to synchronize actions at the spoken word level.

In view of the many possible embodiments to which the principles of our invention may be applied, it should be recognized that the implementations described above are only examples of the invention and should not be taken as a limitation on the scope of the invention. Rather, the scope of the invention is defined by the following claims. We therefore claim as our invention all that comes within the scope and spirit of these claims.

We claim:

1. In a system for animating the user interface displayed on the display monitor of a computer, a method for generating an arbitrary-shaped animation, the method comprising:
   a) loading a sequence of animation frames;
   b) computing a non-rectangular bounding region for a non-transparent portion of a frame in the sequence in real time as the sequence of animation frames are being generated and displayed in the user interface, including computing a non-rectangular bounding region for a non-transparent portion of each frame in the sequence in real time in response to a request to playback the sequence from a client program;
   c) setting a region window to coordinates of the frame in a user interface of the computer, where the region window is in the foreground of the user interface;
   d) setting the region window to the computed non-rectangular bounding region;
   e) drawing the frame to the region window, including clipping the constructed frame to the computed bounding region; and
   f) repeating steps b–e to play the sequence of animation frames in the user interface.

2. The method of claim 1 further including:
   when drawing each of the frames, instructing an application or applications to re-draw a portion of the display screen covered by the bounding region of a previous frame, but no longer covered by the bounding region of the current frame.

3. The method of claim 1 wherein the computer includes a cursor control device and the sequence of animation represents an animated user interface control responsive to user input through the cursor control device, and including:
   clipping user input from the cursor control device to within the non rectangular bounding region of a displayed frame of the animated user interface control.

4. The method of claim 1 further including:
   wherein the step of computing the non-rectangular bounding region comprises scanning the frame for a contiguous run of non-transparent pixels, storing a bounding rectangle for the contiguous run, repeating the scanning and storing steps for subsequent runs of non-transparent pixels to find bounding rectangles for contiguous runs of non-transparent pixels, and combining the bounding rectangles into the non-rectangular bounding region for the frame.

5. The method of claim 1 further including:
   after computing the non-rectangular bounding region for a frame, saving the non-rectangular bounding region in memory and re-using the non-rectangular bounding region to display the computed frame when the sequence of animation is played back again.

6. The method of claim 5 further including:
   after computing each non-rectangular bounding region for a sequence of frames, caching each of the non-rectangular bounding regions in a cache in secondary storage of the computer.

7. A computer-readable medium having computer-executable instructions for performing the steps recited in claim 1.

8. In a computer having a display monitor, a system for generating non-rectangular animation independent of applications running in a windowing user interface of a computer:
   a loader for loading an animation data file and a sequence of animation frames from memory in the computer, each of the animation frames comprises one or more bitmaps;
   a sequencer for reading the animation data file retrieved by the loader and for controlling the playback of the sequence of the animation frames; and
   a regionizer for scanning an animation frame and computing a non-rectangular bounding region for a non-transparent portion of the constructed animation frame in real time as the sequence of constructed animation frames is played in the user interface on the display monitor, wherein the regionizer is operable to compute a non-rectangular bounding region for a non-transparent portion of each frame in the sequence in real-time in response to a request to playback the sequence from a client program; and
   a region window controller for receiving the non-rectangular bounding region from the regionizer, for creating a region window in the user interface independent of any other window in the user interface and having a screen boundary in the user interface defined by the non-rectangular bounding region, and for clipping the constructed animation frame to the non-rectangular bounding region.

9. The system of claim 8 wherein the region window controller is part of a windowing, multi-tasking operating system where applications running in the computer each have one or more windows to display output and receive input from a user through the user interface, and wherein the region window is displayed and receives input independent of the windows of the applications running in the computer.

10. The system of claim 8 wherein the regionizer is operable to compute non-rectangular bounding regions for a sequence of frames in real time in response to a request from a client program to the system to playback the sequence of frames.

11. In a system for animating the user interface displayed on the display monitor of a computer including a cursor control device, a method for generating an arbitrary-shaped animated user interface control in the foreground of the user interface, the method comprising:
   in response to a request by a client program to play a sequence of animation frames:

a) loading the sequence of animation frames into memory where each frame includes a rectangular array of pixels;

b) computing a non-rectangular bounding region for a non-transparent group of pixels from the rectangular array of pixels for a frame in the sequence loaded in step a) in real time as the sequence of animation frames are being generated and displayed in the user interface;

c) setting a region window to coordinates of the frame in a user interface of the computer, where the region window is in the foreground of the user interface and is independent of a window of the client program making the request to play the sequence of animation frames;

d) setting the region window to the computed non-rectangular bounding region;

e) drawing the frame to the region window, including clipping the constructed frame to the computed bounding region;

f) repeating steps b–e to play the sequence of animation frames in the user interface; and clipping user input from the cursor control device to within the non rectangular bounding region of a displayed frame of the animated user interface control.

12. A computer-readable medium having computer-executable instructions for performing the steps recited in claim 11.

13. In a system for animating the user interface displayed on the display monitor of a computer, a method for generating an arbitrary-shaped animation, the method comprising:

a) loading a sequence of animation frames;

b) computing a non-rectangular bounding region for a non-transparent portion of a frame in the sequence in real time as the sequence of animation frames are being generated and displayed in the user interface;

c) setting a region window to coordinates of the frame in a user interface of the computer, where the region window is in the foreground of the user interface;

d) setting the region window to the computed non-rectangular bounding region;

e) drawing the frame to the region window, including clipping the constructed frame to the computed bounding region;

f) repeating steps b–e to play the sequence of animation frames in the user interface;

after computing the non-rectangular bounding region for a frame, saving the non-rectangular bounding region in memory and re-using the non-rectangular bounding region to display the computed frame when the sequence of animation is played back again;

after computing each non-rectangular bounding region for a sequence of frames, caching each non-rectangular bounding region in a MRU cache in main memory of the computer until the cache is full; and replacing a least recently used non-rectangular bounding region in the MRU cache.

14. In a system for animating the user interface displayed on the display monitor of a computer, a method for generating an arbitrary-shaped animation, the method comprising:

a) loading a sequence of animation frames;

b) computing a non-rectangular bounding region for a non-transparent portion of a frame in the sequence in real time as the sequence of animation frames are being generated and displayed in the user interface;

c) setting a region window to coordinates of the frame in a user interface of the computer, where the region window is in the foreground of the user interface;

d) setting the region window to the computed non-rectangular bounding region;

e) drawing the frame to the region window, including clipping the constructed frame to the computed bounding region;

f) repeating steps b–e to play the sequence of animation frames in the user interface;

after computing the non-rectangular bounding region for a frame, saving the non-rectangular bounding region in memory and re-using the non-rectangular bounding region to display the computed frame when the sequence of animation is played back again;

after computing each non-rectangular bounding region for a sequence of frames, caching each of the non-rectangular bounding regions in a cache in secondary storage of the computer;

computing non-rectangular bounding regions corresponding to a first sequence of frames in real time as a client requests playback of the first sequence of frames;

computing non-rectangular bounding regions corresponding to frames of animation in a background thread or process; and caching both the non-rectangular bounding regions for the first sequence of frames and for the frames in which the non-rectangular bounding regions are computed in the background thread or process.

15. In a system for animating the user interface displayed on the display monitor of a computer, a method for generating an arbitrary-shaped animation, the method comprising:

a) loading a sequence of animation frames;

b) computing a non-rectangular bounding region for a non-transparent portion of a frame in the sequence in real time as the sequence of animation frames are being generated and displayed in the user interface;

c) setting a region window to coordinates of the frame in a user interface of the computer, where the region window is in the foreground of the user interface;

d) setting the region window to the computed non-rectangular bounding region;

e) drawing the frame to the region window, including clipping the constructed frame to the computed bounding region;

f) repeating steps b–e to play the sequence of animation frames in the user interface;

computing a first set of non-rectangular bounding regions corresponding to a first sequence of frames of animation in a background thread or process;

storing the first set of non-rectangular bounding regions; and in response to a request to playback the first sequence of frames by a client, drawing the first sequence of frames to the display screen, including clipping each of the frames in the first sequence to a corresponding bounding region in the first set.

16. In a system for animating the user interface displayed on the display monitor of a computer, a method for generating an arbitrary-shaped animation, the method comprising:

a) loading a sequence of animation frames;

b) computing a non-rectangular bounding region for a non-transparent portion of a frame in the sequence in real time as the sequence of animation frames are being generated and displayed in the user interface;

c) setting a region window to coordinates of the frame in a user interface of the computer, where the region window is in the foreground of the user interface;

d) setting the region window to the computed non-rectangular bounding region;

e) drawing the frame to the region window, including clipping the constructed frame to the computed bounding region;

f) repeating steps b–e to play the sequence of animation frames in the user interface; and playing the sequence of frames more than one time, including scaling one or more of the frames in the sequence to reduce or enlarge the size of the non-transparent region in the frame, and computing the non-rectangular bounding region for the reduced or enlarged non-transparent region in real time as the sequence of frames is generated and displayed in the user interface.

17. In a system for animating the user interface displayed on the display monitor of a computer, a method for generating an arbitrary-shaped animation, the method comprising:

a) loading a sequence of animation frames;

b) computing a non-rectangular bounding region for a non-transparent portion of a frame in the sequence in real time as the sequence of animation frames are being generated and displayed in the user interface;

c) setting a region window to coordinates of the frame in a user interface of the computer, where the region window is in the foreground of the user interface;

d) setting the region window to the computed non-rectangular bounding region;

e) drawing the frame to the region window, including clipping the constructed frame to the computed bounding region;

f) repeating steps b–e to play the sequence of animation frames in the user interface;

wherein the computer includes a cursor control device and the sequence of animation represents an animated user interface control responsive to user input through the cursor control device, the method further including:

clipping user input from the cursor control device to within the non rectangular bounding region of a displayed frame of the animated user interface control so that the user interface control only responds to cursor input from the cursor control device when the cursor is positioned within the non-rectangular bounding region of the displayed frame; and in response to user input from the cursor control device, branching to a second sequence of animation frames and repeating steps b–e to play the second sequence of animation frames in the user interface.

18. In a computer having a display monitor, a system for generating non-rectangular animation independent of applications running in a windowing user interface of a computer:

a loader for loading an animation data file and a sequence of animation frames from memory in the computer, each of the animation frames comprising one or more bitmaps;

a sequencer for reading the animation data file retrieved by the loader and for controlling the playback of the sequence of the animation frames; and a regionizer for scanning an animation frame and computing a non-rectangular bounding region for a non-transparent portion of the constructed animation frame in real time as the sequence of constructed animation frames is played in the user interface on the display monitor; and a region window controller for receiving the non-rectangular bounding region from the regionizer, for creating a region window in the user interface independent of any other window in the user interface and having a screen boundary in the user interface defined by the non-rectangular bounding region, and for clipping the constructed animation frame to the non-rectangular bounding region;

wherein the computer is coupled to a cursor control device for enabling the user to control the position of a cursor displayed in the user interface and to enter input signals, and wherein the region window controller is in communication with the cursor control device through a cursor control device driver to receive notification of the input signals only when the user enters the input signals when the cursor is positioned within the non-rectangular bounding region of a current animation frame displayed in the user interface.

19. In a computer having a display monitor, a system for generating non-rectangular animation independent of applications running in a windowing user interface of a computer:

a loader for loading an animation data file and a sequence of animation frames from memory in the computer, each of the animation frames comprises one or more bitmaps;

a sequencer for reading the animation data file retrieved by the loader and for controlling the playback of the sequence of the animation frames; and a regionizer for scanning an animation frame and computing a non-rectangular bounding region for a non-transparent portion of the constructed animation frame in real time as the sequence of constructed animation frames is played in the user interface on the display monitor; and a region window controller for receiving the non-rectangular bounding region from the regionizer, for creating a region window in the user interface independent of any other window in the user interface and having a screen boundary in the user interface defined by the non-rectangular bounding region, and for clipping the constructed animation frame to the non-rectangular bounding region;

wherein the regionizer includes a background thread or process for pre-computing non-rectangular bounding regions for frames before a client program makes a request to the system to playback the frames corresponding to the pre-computed non-rectangular bounding regions.

* * * * *

UNITED STATES PATENT AND TRADEMARK OFFICE
CERTIFICATE OF CORRECTION

PATENT NO.   : 6,121,981
DATED        : September 19, 2000
INVENTOR(S)  : Tandy W. Trower, II et al.

It is certified that error appears in the above-identified patent and that said Letters Patent is hereby corrected as shown below:

Title page,
OTHER PUBLICATIONS, ""Microsoft visual Basic" should read -- Microsoft Visual Basic --.

Column 6,
Line 29, "module 108" should read -- module 110 --.
Line 32, "module 110" should read -- module 108 --.

Column 26,
Line 25, "client itself" should read -- client itself. --.

Signed and Sealed this

Twentieth Day of May, 2003

JAMES E. ROGAN
*Director of the United States Patent and Trademark Office*